(12) United States Patent
Yalcin et al.

(10) Patent No.: US 10,385,193 B2
(45) Date of Patent: Aug. 20, 2019

(54) POLYOLEFIN COMPOSITION INCLUDING HOLLOW GLASS MICROSPHERES AND METHOD OF USING THE SAME

(71) Applicant: 3M INNOVATIVE PROPERTIES COMPANY, St. Paul, MN (US)

(72) Inventors: Baris Yalcin, Roswell, GA (US); Ibrahim S. Gunes, Minneapolis, MN (US); Gustavo B. Carvalho, Indaiatuba (BR); Mark J. Williams, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 42 days.

(21) Appl. No.: 15/109,246

(22) PCT Filed: Dec. 29, 2014

(86) PCT No.: PCT/US2014/072476
§ 371 (c)(1),
(2) Date: Jun. 30, 2016

(87) PCT Pub. No.: WO2015/103099
PCT Pub. Date: Jul. 9, 2015

(65) Prior Publication Data
US 2016/0326352 A1  Nov. 10, 2016

Related U.S. Application Data

(60) Provisional application No. 61/921,848, filed on Dec. 30, 2013.

(51) Int. Cl.
| | | |
|---|---|---|
| *C08L 23/06* | (2006.01) | |
| *C08L 23/12* | (2006.01) | |
| *C08L 23/14* | (2006.01) | |
| *C08K 7/28* | (2006.01) | |
| *C08L 23/08* | (2006.01) | |
| *C08L 51/06* | (2006.01) | |

(52) U.S. Cl.
CPC .............. *C08L 23/06* (2013.01); *C08K 7/28* (2013.01); *C08L 23/0815* (2013.01); *C08L 23/12* (2013.01); *C08L 23/14* (2013.01); *C08L 51/06* (2013.01); *C08L 2207/062* (2013.01)

(58) Field of Classification Search
CPC .......... C08L 23/06; C08L 23/12; C08L 23/14; C08K 7/28
See application file for complete search history.

(56) References Cited

U.S. PATENT DOCUMENTS

| | | |
|---|---|---|
| 2,978,340 A | 4/1961 | Veatch |
| 3,030,215 A | 4/1962 | Veatch |
| 3,129,086 A | 4/1964 | Veatch |
| 3,230,064 A | 1/1966 | Veatch |
| 3,365,315 A | 1/1968 | Beck |
| 4,243,575 A | 1/1981 | Myers |
| 4,391,646 A | 7/1983 | Howell |
| 4,692,480 A | 9/1987 | Takahashi |
| 4,767,726 A | 8/1988 | Marshall |
| 4,923,520 A | 5/1990 | Anzai |
| 5,695,851 A | 12/1997 | Watanabe |
| 6,455,630 B1 | 9/2002 | Rigosi |
| 6,491,984 B2 | 12/2002 | Rigosi |
| 6,586,073 B2 | 7/2003 | Perez |
| 6,753,080 B1 | 6/2004 | Sebastian |
| 7,066,262 B2 | 6/2006 | Funkhouser |
| 7,365,144 B2 | 4/2008 | Ka |
| 7,658,794 B2 | 2/2010 | Gleeson |
| 9,006,302 B2 | 4/2015 | Amos |
| 2006/0105053 A1 | 5/2006 | Marx |
| 2006/0122049 A1 | 6/2006 | Marshall |
| 2007/0104943 A1 | 5/2007 | D'Souza |
| 2007/0116942 A1 | 5/2007 | D'Souza |
| 2007/0155858 A1 | 7/2007 | Israelson |
| 2007/0299160 A1 | 12/2007 | Delanaye |
| 2011/0130506 A1 | 6/2011 | Lee |

FOREIGN PATENT DOCUMENTS

| | | |
|---|---|---|
| CN | 101775173 | 7/2010 |
| CN | 101851371 | 10/2010 |
| CN | 102336968 | 2/2012 |
| CN | 102492221 | 6/2012 |
| CN | 102516639 | 6/2012 |
| CN | 102604209 | 7/2012 |
| GB | 2214186 | 8/1989 |
| JP | 6284496 | 10/1994 |
| JP | 6-340782 | 12/1994 |
| WO | WO 2004-016707 | 2/2004 |
| WO | WO 2011-160183 | 12/2011 |
| WO | WO 2012-151178 | 11/2012 |
| WO | WO 2013-138158 | 9/2013 |
| WO | WO 2014-008123 | 1/2014 |
| WO | WO 2015-103096 | 7/2015 |

OTHER PUBLICATIONS

Arkles, "Silane Coupling Agents: Connecting Across Boundaries", 2006, 60 pages.
Seymour, "Origin and Early Development of Rubber-Toughened Plastics", Rubber-Toughened Plastics, American Chemical Society, 1989, pp. 1-13.
Yalcin, "Polymer Composites with Hollow Glass Microspheres: Processing, Properties and Applications", Advanced Materials Division, 3M Industrial Business Group, 2012, pp. 1-59.
International Search Report for PCT International Application No. PCT/US2014/072476, dated Mar. 23, 2015, 5 pages.

*Primary Examiner* — Edward J Cain

(57) ABSTRACT

A composition that includes a polyolefin having first repeating units, hollow glass microspheres, a polyolefin impact modifier that is chemically non-crosslinked and free of polar functional groups, and a compatibilizer comprising the first repeating units and second repeating units, which are the first repeating units modified with polar functional groups. Articles made from the composition and methods of making an article by injection molding the composition are also disclosed.

20 Claims, No Drawings

POLYOLEFIN COMPOSITION INCLUDING HOLLOW GLASS MICROSPHERES AND METHOD OF USING THE SAME

CROSS-REFERENCE TO RELATED APPLICATION

This is a national stage filing under 35 U.S.C. 371 of PCT/US2014/072476, filed Dec. 29, 2014, which claims priority to U.S. Provisional Application No. 61/921,848, filed Dec. 30, 2014, the disclosure of which is incorporated by reference in its entirety herein.

BACKGROUND

Hollow glass microspheres having an average diameter of less than about 500 micrometers, also commonly known as "glass microbubbles", "glass bubbles", "hollow glass beads", or "glass balloons" are widely used in industry, for example, as additives to polymeric compositions. In many industries, hollow glass microspheres are useful, for example, for lowering weight and improving processing, dimensional stability, and flow properties of a polymeric composition. Generally, it is desirable that the hollow glass microspheres be strong enough to avoid being crushed or broken during processing of the particular polymeric compound. Hollow glass microspheres have been incorporated into polypropylene compositions for certain applications. See, for example, U.S. Pat. No. 7,365,144 (Ka et al.).

SUMMARY

In one aspect, the present disclosure provides a composition including or consisting of a polyolefin comprising first repeating units, hollow glass microspheres, a polyolefin impact modifier that is chemically non-crosslinked and free of polar functional groups, and a compatibilizer comprising the first repeating units and second repeating units, which are the first repeating units modified with polar functional groups. The hollow glass microspheres are present in a range from 40% to 70% by volume, the polyolefin impact modifier is present in a range from 20% to 50% by volume, and the compatibilizer is present in a range from 4% to 12% by volume, based on the total volume of the hollow glass microspheres, the polyolefin impact modifier, and the compatibilizer. The composition typically includes greater than ten percent by weight of the glass, based on the total weight of the composition, which glass may be included in the hollow glass microspheres or non-spherical glass including broken microspheres.

In some embodiments of this aspect, the polyolefin is other than a polypropylene homopolymer. In some embodiments, the composition has a melt flow index at 190° C. and 2.16 kilograms of at least 3 grams per 10 minutes. In some embodiments, the composition has a notched izod impact strength of at least 60 joules/meter. In some embodiments, the polyolefin comprises polyethylene, and the compatibilizer comprises ethylene repeating units. In some embodiments, the first repeating units are polypropylene repeating units, and the compatibilizer comprises propylene repeating units. In these embodiments, the polyolefin may be a copolymer comprising at least 80% by weight propylene units. In these embodiments, the polyolefin may be a medium or high impact polypropylene.

In another aspect, the present disclosure provides an article comprising such a composition when it is solidified.

In another aspect, the present disclosure provides a masterbatch composition for combining with a polyolefin comprising first repeating units. The masterbatch comprises includes hollow glass microspheres, a polyolefin impact modifier that is chemically non-crosslinked and free of polar functional groups, and a compatibilizer comprising the first repeating units and second repeating units modified with polar functional groups. In some embodiments, the masterbatch composition contains the polyolefin comprising first repeating units. In other embodiments, the masterbatch composition does not contain the polyolefin comprising first repeating units. The hollow glass microspheres are present in a range from 40% to 65% by volume, the polyolefin impact modifier is present in a range from 20% to 50% by volume, and the compatibilizer is present in a range from 4% to 15% by volume, based on the total volume of the hollow glass microspheres, the polyolefin impact modifier, and the compatibilizer.

In another aspect, the present disclosure provides a method of making an article, the method comprising injection molding the composition described above to make the article.

The compositions according to the present disclosure are suitable, for example, for injection molding to prepare relatively low density articles typically having good tensile, flexural, and impact strength. For the composition disclosed herein, in many embodiments, at least one of the impact strength (e.g., in some cases, either notched or unnotched impact strength), tensile strength, or flexural strength of the compositions according to the present disclosure approach or in some cases even surprisingly exceed the impact strength of the polyolefin without the addition of hollow glass microspheres. Surprisingly, this improvement was not observed or was not as significant when the compatibilizer included repeating units different from the first repeating units.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated.

The term "crosslinked" refers to joining polymer chains together by covalent chemical bonds, usually via crosslinking molecules or groups, to form a network polymer. Therefore, a chemically non-crosslinked polymer is a polymer that lacks polymer chains joined together by covalent chemical bonds to form a network polymer. A crosslinked polymer is generally characterized by insolubility, but may be swellable in the presence of an appropriate solvent. A non-crosslinked polymer is typically soluble in certain solvents and is typically melt-processable. A polymer that is chemically non-crosslinked may also be referred to as a linear polymer.

A polar functional group is a functional group that includes at least one atom that is more electronegative than carbon. Common elements of organic compounds that are more electronegative than carbon are oxygen, nitrogen, sulfur, and halogens. In some embodiments, a polar functional group is a functional group that includes at least one oxygen atom. Such groups include hydroxyl and carbonyl groups (e.g., such as those in ketones, aldehydes, carboxylic acids, carboxyamides, carboxylic acid anhydrides, and carboxylic acid esters).

The above summary of the present disclosure is not intended to describe each disclosed embodiment or every implementation of the present disclosure. The description that follows more particularly exemplifies illustrative embodiments. It is to be understood, therefore, that the following description should not be read in a manner that would unduly limit the scope of this disclosure.

DETAILED DESCRIPTION

Addition of hollow glass microspheres into a polyolefin such as a polypropylene or high density polyethylene renders them lightweight but usually adversely affects impact strength, tensile strength, and flexural strength. Impact strength, tensile strength, and flexural strength are all attributes of the polyolefin phase, and the addition of hollow glass microspheres dilutes the polyolefin phase. Also, the addition of hollow glass microspheres typically increases viscosity relative to an unfilled polyolefin. An increase in viscosity is a disadvantage, particularly for some polymer processing techniques (e.g., injection molding).

Impact modifiers, which are typically elastomeric materials, are commonly used in polyolefin compositions and can be useful to compensate for the loss in impact strength that accompanies the addition of hollow glass microspheres. Although impact properties can be improved by the addition of impact modifiers, impact modifiers also tend to decrease the tensile and flexural strength of polyolefins. For composites of polyolefins and hollow glass microspheres including impact modifiers, the tensile strength and flexural strength are typically greatly reduced relative to the initial polyolefin due to dilution of the strength-inducing polymer phase as described above and the presence of the soft, rubbery impact modifier. Many impact modifiers are high viscosity, high molecular weight rubbery materials that increase the viscosity of a composition, which is disadvantageous for some polymer processing techniques. Since both the addition of hollow glass microspheres and impact modifiers increase viscosity, impact-modified, polyolefin-hollow glass microsphere composites with viscosities suitable for injection molding, for example, are difficult to achieve.

We have found that the simultaneous use of a polyolefin impact modifier that is chemically non-crosslinked and free of polar functional groups and a compatibilizer comprising repeating units modified with polar functional groups in addition to repeating units that are the same as a matrix polyolefin in a composition increases the impact strength more efficiently than other combinations of impact modifiers and compatibilizers while also providing a tensile strength and a flexural strength in the composition that can approach or even exceed, in some cases, the tensile strength and flexural strength of the matrix polyolefin alone. As described above, higher impact strength typically comes at the expense of lowering the tensile and flexural strength. While not wanting to be bound by theory, it is believed that the functional compatibilizers in which the functional groups are grafted onto a main polymer chain that is the same as the matrix polymer can co-crystallize with the polymer phase, which can lead to an improvement in impact, tensile, and flexural strength. The chemically non-crosslinked impact modifier that is free of polar functional groups and the polyolefin providing the matrix of the composition can be selected to have low viscosities, thus providing a composition that is light-weight, has excellent impact, tensile, and flexural strength, and is well suited to injection molding.

While including hollow glass microspheres in polymeric compositions can provide many benefits, the process of adding glass bubbles into a polymer in a manufacturing process can pose some challenges. Handling glass bubbles may be similar to handling light powders. The hollow glass microspheres may not be easily contained and difficult to use in a clean environment. It can also be difficult to add an accurate amount of hollow glass microspheres to the polymer. Therefore, the present disclosure provides a masterbatch composition useful, for example, for incorporating hollow glass microspheres into a final, end-use injection moldable thermoplastic composition. Delivering the hollow glass microspheres in a masterbatch composition can eliminate at least some of the handling difficulties encountered during manufacturing.

Examples of polyolefins useful for the compositions according to the present disclosure include those made from monomers having the general structure $CH_2\!=\!CHR^{10}$, wherein $R^{10}$ is a hydrogen or alkyl. In some embodiments, $R^{10}$ having up to 10 carbon atoms or from one to six carbon atoms. The first repeating units of such polyolefins would have the general formula —$[CH_2\text{—}CHR^{10}]$—, wherein $R^{10}$ is defined as in any of the aforementioned embodiments. Examples of suitable polyolefins include polyethylene; polypropylene; poly (1-butene); poly (3-methylbutene; poly (4-methylpentene); copolymers of ethylene with propylene, 1-butene, 1-hexene, 1-octene, 1-decene, 4-methyl-1-pentene, and 1-octadecene; and blends of polyethylene and polypropylene. Typically, the compositions according to the present disclosure comprise at least one of polyethylene or polypropylene. It should be understood that a polyolefin comprising polyethylene may be a polyethylene homopolymer or a copolymer containing ethylene repeating units. Similarly, it should be understood that a polyolefin comprising polypropylene may be a polypropylene homopolymer or a copolymer containing propylene repeating units. The polyolefin comprising at least one of polyethylene or polypropylene may also be part a blend of different polyolefins that includes at least one of polypropylene or polyethylene. Useful polyethylene polymers include high density polyethylene (e.g., those having a density of such as from 0.94 to about 0.98 $g/cm_3$) and linear or branched low-density polyethylenes (e.g. those having a density of such as from 0.89 to 0.94 $g/cm_3$). Useful polypropylene polymers include low impact, medium impact, or high impact polypropylene. A high impact polypropylene may be a copolymer of polypropylene including at least 80, 85, 90, or 95% by weight propylene repeating units, based on the weight of the copolymer. In these embodiments, it should be understood that the first repeating units are those most abundant in the copolymer. The polyolefin may comprise mixtures of stereoisomers of such polymers (e.g., mixtures of isotactic polypropylene and atactic polypropylene). Suitable polypropylene can be obtained from a variety of commercial sources, for example, LyondellBasell, Houston, Tex., under the trade designations "PRO-FAX" and "HIFAX", and from Pinnacle Polymers, Garyville, La., under the trade designation "PINNACLE". In some embodiments, the first repeating units in the polyolefin are propylene repeating units. In some embodiments, the repeating units in the polyolefin consist of propylene repeating units. In some embodiments, the first repeating units in the polyolefin are ethylene repeating units. In some embodiments, the polyolefin is a polyethylene. In some embodiments, the repeating units in the polyolefin consist of ethylene repeating units. In some embodiments, the polyethylene is high density polyethylene. Suitable polyethylene can be obtained from a variety of commercial sources, for example, Braskem S. A., Sao Paolo, Brazil.

The polyolefin may be selected to have a relatively low viscosity as measured by melt flow index. In some embodiments, the polyolefin has a melt flow index at 230° C. and 2.16 kilograms of at least 3 grams per 10 minutes (in some embodiments, at least 5, 10, 15, 20, 25, 30, 35, 40, or 50 grams per 10 minutes). The melt flow index of the polyolefin is measured by ASTM D1238-13: Standard Test Method for Melt Flow Rates of Thermoplastics by Extrusion Plastometer.

In the final (e.g., let-down) composition suitable for injection molding articles, the polyolefin comprising first repeating units is typically the major component of the compositions according to the present disclosure and/or useful in the methods according to the present disclosure. In general, the polyolefin provides at least 50 percent by weight, based on the total weight of the composition. In some embodiments, the polyolefin comprising first repeating units is present in a range from 50 percent to 75 percent, 55 percent to 70 percent, or 60 percent to 70 percent by weight, based on the total weight of the composition.

A masterbatch composition according to the present disclosure, may or may not contain the polyolefin comprising first repeating units. In some embodiments, the masterbatch comprises the polyolefin comprising the first repeating units, but at a lower percentage than in the let-down compositions suitable for injection molding described above. In some embodiments, the masterbatch comprises the polyolefin in an amount up to 5, 4, 3, or 2 percent by weight, based on the total weight of the masterbatch. The process of combining a masterbatch with other compatible materials is commonly referred to as "letting down" the masterbatch. In the present disclosure, the composition that is made from the masterbatch can also be referred to as the let-down composition. A composition useful for letting down a masterbatch composition typically includes the polyolefin in a sufficient amount to make the let-down composition described above.

The compatibilizer includes the same repeating units, which are the first repeating units, as the polyolefin in the compositions according to the present disclosure. The compatibilizer also includes second repeating units, which are the first repeating units modified with polar functional groups. In some embodiments, the polar functional groups include maleic anhydride, carboxylic acid groups, and hydroxyl groups. In some embodiments, the compatibilizer is a maleic anhydride-modified polyolefin. When the polyolefin in the composition comprises polypropylene, the compatibilizer is a maleic anhydride-modified polypropylene. When the polyolefin in the composition comprises polyethylene, the compatibilizer is a maleic anhydride-modified polyethylene. The compatibilizer is added to the composition in an amount sufficient to improve the mechanical properties of the composition. The level of grafting of the polar functional groups (e.g., the level of grafting of maleic anhydride in the modified polyolefin may be in a range from about 0.5-3%, 0.5-2%, 0.8-1.2%, or about 1%).

In a let-down composition, the compatibilizer may be present in the composition in an amount greater than two percent, based on the total weight of the composition. In some embodiments, compatibilizer is present in the composition in amount of at least 2.5, 3, 3.5, or 4 percent, based on the total weight of the composition. In a let-down composition, the compatibilizer may be present in the composition in an amount greater than 1.5 percent, based on the total volume of the composition. In some embodiments, compatibilizer is present in the composition in amount of at least in a range from 1.5 percent to 4 percent or 2 percent to 4 percent, based on the total volume of the composition.

In a masterbatch composition, the compatibilizer may be present in a range from 4% to 15% by volume, in some embodiments, 10% to 15% by volume, based on the total volume of the masterbatch composition. A composition for letting down the masterbatch may also include 4% to 15% by volume, in some embodiments, 10% to 15% by volume compatibilizer, based on the total weight of the composition for letting down the masterbatch.

Example 12, below, describes a polypropylene composition that includes a polypropylene compatibilizer. In comparison to Comparative Example 7E, when the compatibilizer is made from a polyethylene, and therefore does not have the same first repeating units as the polypropylene, the composition has inferior notched impact strength, tensile strength, and flexural strength than when the compatibilizer comprises polypropylene repeating units (that is, the same first repeating units as the polyolefin). The effect is even more pronounced for a higher impact polypropylene as shown by a comparison of Example 30 and Comparative Example 15A in Table 19 and for a high density polyethylene as shown by a comparison of Example 3 and Comparative Example 1B in Table 4. In comparison to Comparative Example 1B, when the compatibilizer is made from a polypropylene, and therefore does not have the same first repeating units as the polyethylene, the composition has inferior tensile strength and flexural strength and far inferior notched impact strength than when the compatibilizer comprises polyethylene repeating units (that is, the same first repeating units as the polyolefin).

The impact modifier also is a polyolefin, is chemically non-crosslinked, and is free of polar functional groups. For example, the impact modifier is free of any of the polar functional groups described above in connection with the compatibilizer. In some embodiments, the impact modifier includes only carbon-carbon and carbon-hydrogen bonds. In some embodiments, the polyolefin impact modifier is an ethylene propylene elastomer, an ethylene octene elastomer, an ethylene propylene diene elastomer, an ethylene propylene octene elastomer, polybutadiene, a butadiene copolymer, polybutene, or a combination thereof. In some embodiments, the polyolefin impact modifier is an ethylene octene elastomer.

The impact modifier may be selected to have a relatively low viscosity as measured by melt flow index. A combination of impact modifiers having different melt flow indexes may also be useful. In some embodiments, at least one of the polyolefin impact modifiers has a melt flow index at 190° C. and 2.16 kilograms of at least 10 grams per 10 minutes (in some embodiments, at least 11, 12, or 13 grams per 10 minutes). The melt flow index of the impact modifiers and the polyolefin is measured by ASTM D1238-13: Standard Test Method for Melt Flow Rates of Thermoplastics by Extrusion Plastometer.

Other common types of impact modifiers such as ground rubber, core-shell particles, functionalized elastomers available, for example, from Dow Chemical Company, Midland, Mich., under the trade designation "AMPLIFY GR-216", and particles available, for example, from Akzo Nobel, Amsterdam, The Netherlands, under the trade designation "EXPANCEL" are at least one of chemically crosslinked or functionalized and are not included in the compositions according to the present disclosure. Many of these impact modifiers increase the viscosity of a composition, making the composition less suitable for some polymer processing techniques (e.g., injection molding). In addition, "EXPANCEL" particles and similar particles require more strict thermal control and more precise handling than the polyolefin impact modifiers described herein, which can present challenges during processing.

The impact modifier can be added to the composition according to the present disclosure in an amount sufficient to improve the impact strength of the composition.

In a let-down composition, the impact modifier may be present in the composition in a range from 7.5 percent to 25 percent by volume, based on the total volume of the composition. In some embodiments, impact modifier is present in the composition in amount of at least 10, 12, 14, 15, or 16 percent and up to about 20 percent by volume, based on the total volume of the composition. Less impact modifier may be required with a lower level of hollow glass microspheres. A composition for letting down a masterbatch may also include the impact modifier in any suitable range (e.g., any of the ranges described above) depending on the desired final composition.

In a masterbatch composition, the impact modifier may be present in the composition in a range from 50 percent to 75 percent by volume, based on the total volume of the composition. In some embodiments, impact modifier is present in the masterbatch composition in amount of at least 50, 55, or 60 percent and up to about 65, 70, or 75 percent by volume, based on the total volume of the composition. In some embodiments of a masterbatch composition, the impact modifier is present in a range from 60 to 70 percent by volume, based on the total volume of the composition.

Hollow glass microspheres useful in the compositions and methods according to the present disclosure can be made by techniques known in the art (see, e.g., U.S. Pat. No. 2,978,340 (Veatch et al.); U.S. Pat. No. 3,030,215 (Veatch et al.); U.S. Pat. No. 3,129,086 (Veatch et al.); and U.S. Pat. No. 3,230,064 (Veatch et al.); U.S. Pat. No. 3,365,315 (Beck et al.); U.S. Pat. No. 4,391,646 (Howell); and U.S. Pat. No. 4,767,726 (Marshall); and U. S. Pat. App. Pub. No. 2006/0122049 (Marshall et. al). Techniques for preparing hollow glass microspheres typically include heating milled frit, commonly referred to as "feed", which contains a blowing agent (e.g., sulfur or a compound of oxygen and sulfur). Frit can be made by heating mineral components of glass at high temperatures until molten glass is formed.

Although the frit and/or the feed may have any composition that is capable of forming a glass, typically, on a total weight basis, the frit comprises from 50 to 90 percent of $SiO_2$, from 2 to 20 percent of alkali metal oxide, from 1 to 30 percent of $B_2O_3$, from 0.005-0.5 percent of sulfur (for example, as elemental sulfur, sulfate or sulfite), from 0 to 25 percent divalent metal oxides (for example, CaO, MgO, BaO, SrO, ZnO, or PbO), from 0 to 10 percent of tetravalent metal oxides other than $SiO_2$ (for example, $TiO_2$, $MnO_2$, or $ZrO_2$), from 0 to 20 percent of trivalent metal oxides (for example, $Al_2O_3$, $Fe_2O_3$, or $Sb_2O_3$), from 0 to 10 percent of oxides of pentavalent atoms (for example, $P_2O_5$ or $V_2O_5$), and from 0 to 5 percent fluorine (as fluoride) which may act as a fluxing agent to facilitate melting of the glass composition. Additional ingredients are useful in frit compositions and can be included in the frit, for example, to contribute particular properties or characteristics (for example, hardness or color) to the resultant glass bubbles.

In some embodiments, the hollow glass microspheres useful in the compositions and methods according to the present disclosure have a glass composition comprising more alkaline earth metal oxide than alkali metal oxide. In some of these embodiments, the weight ratio of alkaline earth metal oxide to alkali metal oxide is in a range from 1.2:1 to 3:1. In some embodiments, the hollow glass microspheres have a glass composition comprising $B_2O_3$ in a range from 2 percent to 6 percent based on the total weight of the glass bubbles. In some embodiments, the hollow glass microspheres have a glass composition comprising up to 5 percent by weight $Al_2O_3$, based on the total weight of the hollow glass microspheres. In some embodiments, the glass composition is essentially free of $Al_2O_3$. "Essentially free of $Al_2O_3$" may mean up to 5, 4, 3, 2, 1, 0.75, 0.5, 0.25, or 0.1 percent by weight $Al_2O_3$. Glass compositions that are "essentially free of $Al_2O_3$" also include glass compositions having no $Al_2O_3$. Hollow glass microspheres useful for practicing the present disclosure may have, in some embodiments, a chemical composition wherein at least 90%, 94%, or even at least 97% of the glass comprises at least 67% $SiO_2$, (e.g., a range of 70% to 80% $SiO_2$), a range of 8% to 15% of an alkaline earth metal oxide (e.g., CaO), a range of 3% to 8% of an alkali metal oxide (e.g., $Na_2O$), a range of 2% to 6% $B_2O_3$, and a range of 0.125% to 1.5% $SO_3$. In some embodiments, the glass comprises in a range from 30% to 40% Si, 3% to 8% Na, 5% to 11% Ca, 0.5% to 2% B, and 40% to 55% 0, based on the total of the glass composition.

The "average true density" of hollow glass microspheres is the quotient obtained by dividing the mass of a sample of hollow glass microspheres by the true volume of that mass of hollow glass microspheres as measured by a gas pycnometer. The "true volume" is the aggregate total volume of the hollow glass microspheres, not the bulk volume. The average true density of the hollow glass microspheres useful for practicing the present disclosure is generally at least 0.30 grams per cubic centimeter (g/cc), 0.35 g/cc, or 0.38 g/cc. In some embodiments, the hollow glass microspheres useful for practicing the present disclosure have an average true density of up to about 0.65 g/cc. "About 0.65 g/cc" means 0.65 g/cc±five percent. In some of these embodiments, the average true density of the hollow glass microspheres is up to 0.6 g/cc or 0.55 g/cc. For example, the average true density of the hollow glass microspheres disclosed herein may be in a range from 0.30 g/cc to 0.65 g/c, 0.30 g/cc to 0.6 g/cc, 0.35 g/cc to 0.60 g/cc, or 0.35 g/cc to 0.55 g/cc. Hollow glass microspheres having any of these densities can be useful for lowering the density of the composition according to the present disclosure, relative to polyolefin compositions that do not contain hollow glass microspheres.

For the purposes of this disclosure, average true density is measured using a pycnometer according to ASTM D2840-69, "Average True Particle Density of Hollow Microspheres". The pycnometer may be obtained, for example, under the trade designation "ACCUPYC 1330 PYCNOMETER" from Micromeritics, Norcross, Ga., or under the trade designations "PENTAPYCNOMETER" or "ULTRAPYCNOMETER 1000" from Formanex, Inc., San Diego, Calif. Average true density can typically be measured with an accuracy of 0.001 g/cc. Accordingly, each of the density values provided above can be ±five percent.

A variety of sizes of hollow glass microspheres may be useful. As used herein, the term size is considered to be equivalent with the diameter and height of the hollow glass microspheres. In some embodiments, the hollow glass microspheres can have a median size by volume in a range from 14 to 45 micrometers (in some embodiments from 15 to 40 micrometers, 20 to 45 micrometers, or 20 to 40 micrometers). The median size is also called the D50 size, where 50 percent by volume of the hollow glass microspheres in the distribution are smaller than the indicated size. For the purposes of the present disclosure, the median size by volume is determined by laser light diffraction by dispersing the hollow glass microspheres in deaerated, deionized water. Laser light diffraction particle size analyzers are available, for example, under the trade designation "SATURN DIGISIZER" from Micromeritics. The size distribution of the hollow glass microspheres useful for practicing the present disclosure may be Gaussian, normal, or non-normal. Non-normal distributions may be unimodal or multi-modal (e.g., bimodal).

The hollow glass microspheres useful in the compositions and methods according to the present disclosure typically need to be strong enough to survive the injection molding process. A useful hydrostatic pressure at which ten percent by volume of the hollow glass microspheres collapses is at least about 20 (in some embodiments, at least about 38, 50, or 55) megapascals (MPa). "About 20 MPa" means 20 MPa±five percent. In some embodiments, a hydrostatic pressure at which ten percent by volume of the hollow glass microspheres collapses can be at least 100, 110, or 120 MPa. In some embodiments, a hydrostatic pressure at which ten percent, or twenty percent, by volume of the hollow glass microspheres collapses is up to 250 (in some embodiments, up to 210, 190, or 170) MPa. The hydrostatic pressure at which ten percent by volume of hollow glass microspheres collapses may be in a range from 20 MPa to 250 MPa, 38 MPa to 210 MPa, or 50 MPa to 210 MPa. For the purposes of the present disclosure, the collapse strength of the hollow glass microspheres is measured on a dispersion of the hollow glass microspheres in glycerol using ASTM D3102-72 "Hydrostatic Collapse Strength of Hollow Glass Microspheres"; with the exception that the sample size (in grams) is equal to 10 times the density of the glass bubbles. Collapse strength can typically be measured with an accuracy of ±about five percent. Accordingly, each of the collapse strength values provided above can be ±five percent.

Hollow glass microspheres useful for practicing the present disclosure can be obtained commercially and include those marketed by 3M Company, St. Paul, Minn., under the trade designation "3M GLASS BUBBLES" (e.g., grades S60, S60HS, iM30K, iM16K, S38HS, S38XHS, K42HS, K46, and H50/10000). Other suitable hollow glass microspheres can be obtained, for example, from Potters Industries, Valley Forge, Pa., (an affiliate of PQ Corporation) under the trade designations "SPHERICEL HOLLOW GLASS SPHERES" (e.g., grades 110P8 and 60P18) and "Q-CEL HOLLOW SPHERES" (e.g., grades 30, 6014, 6019, 6028, 6036, 6042, 6048, 5019, 5023, and 5028), from Silbrico Corp., Hodgkins, Ill. under the trade designation "SIL-CELL" (e.g., grades SIL 35/34, SIL-32, SIL-42, and SIL-43), and from Sinosteel Maanshan Inst. of Mining Research Co., Maanshan, China, under the trade designation "Y8000". In some embodiments, hollow glass microspheres useful for practicing the present disclosure may be selected to have crush strengths of at least about 28 MPa, 34 MPa, 41 MPa, 48 MPa, or 55 MPa for 90% survival.

In a let-down (i.e., final) composition suitable for injection molding, for example, the hollow glass microspheres are typically present in the composition disclosed herein at a level of at least 5 percent by weight, based on the total weight of the composition. In some embodiments, the hollow glass microspheres are present in the composition at least at 10, 12, or 13 percent by weight based on the total weight of the composition. In some embodiments, the hollow glass microspheres are present in the composition at a level of up to 30, 25, or 20 percent by weight, based on the total weight of the composition. For example, the hollow glass microspheres may be present in the composition in a range from 5 to 30, 10 to 25, or 10 to 20 percent by weight, based on the total weight of the composition.

While in the compositions according to the present disclosure, which include impact modifier, compatibilizer, and hollow glass microspheres as described above in any of their embodiments, the presence of each of these is critical to the performance of the final composition. As shown throughout the examples, below, while the addition of an impact modifier can improve the impact strength of a composition including a polyolefin and hollow glass microspheres, it typically does so at the expense of tensile strength and flexural strength. The addition of a compatibilizer to these compositions typically significantly enhances the tensile strength, flexural strength, and impact strength. As shown in Table 10, the presence of compatibilizers does not significantly change the impact strength of polypropylene containing hollow glass microspheres in the absence of an impact modifier. Surprisingly, the improvement in impact strength when a compatibilizer is used in the presence of an impact modifier does not occur in the absence of hollow glass microspheres.

The composition according to the present disclosure and/or useful for practicing the method disclosed herein, which includes the polyolefin comprising first repeating units, the hollow glass microspheres, the polyolefin impact modifier, and the compatibilizer as described above in any of their embodiments has a melt flow index that renders it suitable for injection molding. Typically, the composition has a melt flow index at 190° C. and 2.16 kilograms of at least 3 grams per 10 minutes (in some embodiments, at least 5, 10, 15, 20, 25, 30, 35, 40, or 50 grams per 10 minutes). In some embodiments, the composition has a melt flow index at 190° C. and 2.16 kilograms of at least 3.5 grams per 10 minutes (in some embodiments, at least 4, 4.5, or 50 grams per 10 minutes). The melt flow index of the polyolefin is measured by ASTM D1238-13: Standard Test Method for Melt Flow Rates of Thermoplastics by Extrusion Plastometer.

In some embodiments of the composition according to the present disclosure, the hollow glass microspheres may be treated with a coupling agent to enhance the interaction between the hollow glass microspheres and the polyolefin matrix. In other embodiments, a coupling agent can be added directly to the composition. Examples of useful coupling agents include zirconates, silanes, or titanates. Typical titanate and zirconate coupling agents are known to those skilled in the art and a detailed overview of the uses and selection criteria for these materials can be found in Monte, S. J., Kenrich Petrochemicals, Inc., "Ken-React® Reference Manual—Titanate, Zirconate and Aluminate Coupling Agents", Third Revised Edition, March, 1995. If used, coupling agents are commonly included in an amount of about 1% to 3% by weight, based on the total weight of the hollow glass microspheres in the composition.

Suitable silanes are coupled to glass surfaces through condensation reactions to form siloxane linkages with the siliceous glass. This treatment renders the filler more wettable or promotes the adhesion of materials to the hollow glass microsphere surface. This provides a mechanism to bring about covalent, ionic or dipole bonding between hollow glass microspheres and organic matrices. Silane coupling agents are chosen based on the particular functionality desired. Another approach to achieving intimate hollow glass microsphere-polymer interactions is to functionalize the surface of microsphere with a suitable coupling agent that contains a polymerizable moiety, thus incorporating the material directly into the polymer backbone. Examples of polymerizable moieties are materials that contain olefinic functionality such as styrenic, vinyl (e.g., vinyltriethoxysilane, vinyltri(2-methoxyethoxy) silane), acrylic and methacrylic moieties (e.g., 3-metacrylroxypropyltrimethoxysilane). Examples of useful silanes that may participate in vulcanization crosslinking include 3-mercaptopropyltrimethoxysilane, bis(triethoxysilipropyl)tetrasulfane (e.g., available under the trade designation "SI-69" from Evonik Industries, Wesseling, Germany), and thiocyanatopropyltriethoxysilane. Still other useful silane coupling agents may have amino functional groups (e.g., N-2-(aminoethyl)-3-aminopropyltrimethoxysilane and (3-aminopropyl) trimethoxysilane). Coupling agents useful for peroxide-cured rubber compositions typically include vinyl silanes. Coupling agents useful for sulfur-cured rubber compositions typically include mercapto or polysulfido silanes. Suitable silane coupling strategies are outlined in Silane Coupling Agents: Connecting Across Boundaries, by Barry Arkles, pg 165-189, Gelest Catalog 3000—A Silanes and Silicones: Gelest Inc. Morrisville, Pa.

Although coupling agents are useful in some embodiments, advantageously, the compositions according to the present disclosure provide good mechanical properties even in the absence of coupling agents. The mechanical properties achieved may be understood by a person skilled in the art to be due to good adhesion between the hollow glass microspheres and the polyolefin matrix. Accordingly, in some embodiments, the hollow glass microspheres in the compositions according to the present disclosure are not treated with a silane coupling agent. Further, in some embodiments, compositions according to the present disclosure are substantially free of a silane coupling agent. Compositions substantially free of silane coupling agents may be free of silane coupling agents or may have silane coupling agents present at a level of less than 0.05, 0.01, 0.005, or 0.001 percent by weight, based on the total weight of the composition.

In some embodiments, the compositions according to and/or useful in the method according to the present disclosure includes one or more stabilizers (e.g., antioxidants or hindered amine light stabilizers (HALS)). For example, any of the compositions, masterbatch compositions, or the let-down compositions described herein can include one or more of such stabilizers. Examples of useful antioxidants include hindered phenol-based compounds and phosphoric acid ester-based compounds (e.g., those available from BASF, Florham Park, N.J., under the trade designations "IRGANOX" and "IRGAFOS" such as "IRGANOX 1076" and "IRGAFOS 168", those available from Songwon Ind. Co, Ulsan, Korea, under the trade designations "SONGNOX", and butylated hydroxytoluene (BHT)). Antioxidants, when used, can be present in an amount from about 0.001 to 1 percent by weight based on the total weight of the composition. HALS are typically compounds that can scavenge free-radicals, which can result from photodegradation or other degradation processes. Suitable HALS include decanedioic acid, bis (2,2,6,6-tetramethyl-1-(octyloxy)-4-piperidinyl)ester. Suitable HALS include those available, for example, from BASF under the trade designations "TINUVIN" and "CHIMASSORB". Such compounds, when used, can be present in an amount from about 0.001 to 1 percent by weight based on the total weight of the composition.

Reinforcing filler may be useful in the composition according to and/or useful in the method according to the present disclosure. For example, any of the compositions, masterbatch compositions, or the let-down compositions described herein can include one or more of such reinforcing fillers. Reinforcing filler can be useful, for example, for enhancing the tensile, flexural, and/or impact strength of the composition. Examples of useful reinforcing fillers include silica (including nanosilica), other metal oxides, metal hydroxides, and carbon black. Other useful fillers include glass fiber, wollastonite, talc, calcium carbonate, titanium dioxide (including nano-titanium dioxide), wood flour, other natural fillers and fibers (e.g., walnut shells, hemp, and corn silks), and clay (including nano-clay).

However, in some embodiments, the presence of silica in the composition according to the present disclosure can lead to an undesirable increase in the density of the composition. Advantageously, the compositions according to the present disclosure and/or useful in the methods according to the present disclosure provide good mechanical properties even in the absence of reinforcing fillers. As shown in the Examples, below, it has been found that compositions disclosed herein have high tensile, flexural, and impact strength even in the absence of silica filler or other reinforcing filler. Accordingly, in some embodiments, the composition is free of reinforcing filler or contains up to 5, 4, 3, 2, or 1 percent by weight reinforcing filler, based on the total weight of the composition. For example, in some embodiments, the composition is free of talc or contains up to 5, 4, 3, 2, or 1 percent by weight talc, based on the total weight of the composition. In some embodiments, the composition contains less than 5 percent by weight talc, based on the total weight of the composition. In another example, the composition according to the present disclosure is free of or comprises less than one percent by weight of montmorillonite clay having a chip thickness of less than 25 nanometers. In another example, the composition according to the present disclosure is free of or comprises or comprises less than one percent by weight of calcium carbonate having a mean particle size of less than 100 nanometers.

Other additives may be incorporated into the composition disclosed herein in any of the embodiments described above. Examples of other additives that may be useful, depending on the intended use of the composition, include preservatives, mixing agents, colorants, dispersants, floating or anti-setting agents, flow or processing agents, wetting agents, anti-ozonant, and odor scavengers. Any of the compositions, masterbatch compositions, or the let-down compositions described herein can include one or more of such additives.

Compositions according to the present disclosure are suitable for injection molding. Elevated temperatures (e.g., in a range from 100° C. to 225° C.) may be useful for mixing the components of the composition in an extruder. Hollow glass microspheres may be added to the composition after the polyolefin, compatibilizer, and impact modifier are combined. The method of injection molding the composition disclosed herein can utilize any type of injection molding equipment, generally including a material hopper (e.g., barrel), a plunger (e.g., injection ram or screw-type), and a heating unit.

The composition and method according to the present disclosure are useful for making low density products (e.g., having a density in a range from 0.75 to 0.95, 0.78 to 0.9, or 0.8 to 0.9 grams per cubic centimeter) with good tensile strength, flexural strength, and impact resistance, which are useful properties for a variety of applications. Articles that can be made by injecting molding the compositions according to the present disclosure include hardhats and interior and exterior automobile component (e.g., hoods, trunks, bumpers, grilles, side claddings, rocker panels, fenders, tail-gates, in wire and cable applications, instrument panels, consoles, interior trim, door panels, heater housings, battery supports, headlight housings, front ends, ventilator wheels, reservoirs, and soft pads).

In many embodiments, as shown in the Examples, below, at least one of the impact strength, tensile strength, or flexural strength of the compositions according to the present disclosure approach or in some cases even surprisingly exceed the impact strength of the polyolefin without the addition of hollow glass microspheres.

Some Embodiments of the Disclosure

In a first embodiment, the present disclosure provides a composition comprising:

a polyolefin comprising first repeating units;
hollow glass microspheres;
a polyolefin impact modifier that is chemically non-crosslinked and free of polar functional groups; and
a compatibilizer comprising the first repeating units and second repeating units, which are the first repeating units modified with polar functional groups,
wherein the hollow glass microspheres are present in a range from 40% to 70% by volume, the polyolefin impact modifier is present in a range from 20% to 50% by volume, and the compatibilizer is present in a range from 4% to 12% by volume, based on the total volume of the hollow glass microspheres, the polyolefin impact modifier, and the compatibilizer. The composition may also have any of the following features, alone or in combination:

the composition comprises greater at least ten percent by weight of the glass, based on the total weight of the composition;

the polyolefin is other than a polypropylene homopolymer;

the composition has a melt flow index at 190° C. and 2.16 kilograms of at least 3 grams per 10 minutes;

the composition has a notched izod impact strength of at least 60 joules/meter, the polyolefin comprises polyethylene, and the compatibilizer comprises ethylene repeating units;

the first repeating units are polypropylene repeating units, and the compatibilizer comprises propylene repeating units, and the polyolefin is a copolymer comprising at least 80% by weight propylene unit or the polyolefin is a medium or high impact polypropylene.

In an alternate first embodiment, the present disclosure provides a masterbatch composition for combining with a polyolefin comprising first repeating units, wherein the masterbatch comprises:

hollow glass microspheres;
a polyolefin impact modifier that is chemically non-crosslinked and free of polar functional groups; and
a compatibilizer comprising the first repeating units and second repeating units, which are the first repeating units modified with polar functional groups,
wherein the hollow glass microspheres are present in a range from 40% to 65% by volume, the polyolefin impact modifier is present in a range from 20% to 50% by volume, and the compatibilizer is present in a range from 4% to 15% by volume, based on the total volume of the hollow glass microspheres, the polyolefin impact modifier, and the compatibilizer.

In a second embodiment, the present disclosure provides the composition of the first embodiment, wherein the polyolefin comprises at least one of polyethylene or polypropylene.

In a third embodiment, the present disclosure provides the composition of the first or second embodiment, wherein the first repeating units are polyethylene repeating units.

In a fourth embodiment, the present disclosure provides the composition of any one of the first to third embodiments, wherein the polyolefin impact modifier has a melt flow index at 190° C. and 2.16 kilograms of at least 10 grams per 10 minutes.

In a fifth embodiment, the present disclosure provides the composition of any one of the first to fourth embodiments, comprising greater than ten percent by weight of the hollow glass microspheres, based on the total weight of the composition.

In a sixth embodiment, the present disclosure provides the composition of any one of the first to fifth embodiments, comprising greater than two percent by weight of the compatibilizer, based on the total weight of the composition.

In a seventh embodiment, the present disclosure provides the composition of any one of the first to sixth embodiments, comprising greater than three percent by weight of the compatibilizer, based on the total weight of the composition.

In an eighth embodiment, the present disclosure provides the composition of any one of the first to seventh embodiments, wherein the compatibilizer is a maleic anhydride-modified polyolefin.

In a ninth embodiment, the present disclosure provides the composition of any one of the first to eighth embodiments, further comprising reinforcing fillers.

In a tenth embodiment, the present disclosure provides the composition any one of the first to ninth embodiments, wherein the composition comprises less than five percent by weight talc, based on the total weight of the composition.

In an eleventh embodiment, the present disclosure provides the composition of any one of the first to tenth embodiments, wherein the composition comprises less than one percent by weight of at least one of montmorillonite clay having a chip thickness of less than 25 nanometers or calcium carbonate having a mean particle size of less than 100 nanometers.

In a twelfth embodiment, the present disclosure provides the composition of any one of the first to eleventh embodiments, wherein the hollow glass microspheres are not treated with a silane coupling agent.

In a thirteenth embodiment, the present disclosure provides the composition of any one of the first to twelfth embodiments, wherein a hydrostatic pressure at which ten percent by volume of the hollow glass microspheres collapses is at least about 50 megapascals.

In a fourteenth embodiment, the present disclosure provides the composition of any one of the first to thirteenth embodiments, wherein the polyolefin impact modifier is an ethylene propylene elastomer, an ethylene octene elastomer, an ethylene propylene diene elastomer, an ethylene propylene octene elastomer, or a combination thereof.

In a fifteenth embodiment, the present disclosure provides the composition of any one of the first to fourteenth embodiments, wherein the polyolefin impact modifier is an ethylene octene elastomer.

In a sixteenth embodiment, the present disclosure provides an article comprising a solidified composition of any one of the first to fifteenth embodiments.

In a seventeenth embodiment, the present disclosure provides the article of the sixteenth embodiment, wherein the article is a hardhat.

In an eighteenth embodiment, the present disclosure provides the article of the sixteenth embodiment, wherein the article is an interior or exterior automobile component.

In a nineteenth embodiment, the present disclosure provides a method of making an article, the method comprising injection molding the composition of any one of the first to fifteenth embodiments to make the article.

In a twentieth embodiment, the present disclosure provides the method of the nineteenth embodiment, wherein the article is a hardhat.

In a twenty-first embodiment, the present disclosure provides the method of the nineteenth embodiment, wherein the article is an interior or exterior automobile component.

The following specific, but non-limiting, examples will serve to illustrate the invention. In these examples, all amounts are expressed in parts per hundred resin (phr) unless specified otherwise. In these examples, N/M means "not measured".

EXAMPLES

Materials

TABLE 1

| Abbreviation | Material Description |
|---|---|
| PP1 | Commercially available from LyondellBasell, Houston, TX, under the trade designation "PRO-FAX 6523". Low impact polypropylene homopolymer. Melt flow rate (MFI) 4.00 g/10 min (230° C./2.16 kg) |
| PP2 | Commercially available from LyondellBasell, Houston, TX, under the trade designation "PRO-FAX 7523". Medium impact polypropylene copolymer. Melt flow rate 4.00 g/10 min (230° C./2.16 kg) |
| PP3 | Commercially available from LyondellBasell, Houston, TX, under the trade designation "PRO-FAX 8523". Very high Impact polypropylene copolymer. Melt flow rate 4.00 g/10 min (230° C./2.16 kg) |
| PP4 | Commercially available from Pinnacle Polymers, Garyville, LA, under the trade designation "Pinnacle PP 4208". High Impact PP copolymer. Melt Flow rate 8.00 g/10 min (230° C./2.16 kg) |
| PP5 | Commercially available from Pinnacle Polymers, Garyville, LA, under the trade designation "Pinnacle PP 4220H". High Impact PP copolymer. Melt Flow rate 20.00 g/10 min (230° C./2.16 kg) |
| PP6 | Commercially available from Pinnacle Polymers, Garyville, LA, under the trade designation "Pinnacle PP 4130H". High Impact PP copolymer. Melt flow rate 35.00 g/10 min (230° C./2.16 kg) |
| PP7 | Commercially available from Pinnacle Polymers, Garyville, LA, under the trade designation "Pinnacle PP 4150H". High Impact PP copolymer. Melt Flow rate 55.00 g/10 min (230° C./2.16 kg) |
| PP8 | Commercially available from LyondellBasell, Houston, TX, under the trade designation "Hifax CA 387 A". It is a reactor TPO (thermoplastic polyolefin) manufactured using LyondellBasell's Catalloy process technology. Melt flow rate (MFI) 18.00 g/10 min (230° C./2.16 kg) |
| C1 | Maleic anhydride modified homopolymer polypropylene under the trade name POLYBOND ® 3200 available from Addivant. Melt flow rate (190 C./2.16 kg) 115 g/10 min. 0.8-1.2% Maleic anhydride content, |
| C2 | Maleic anhydride modified high density polyethylene under the trade name POLYBOND ® 3009 available from Addivant. Melt flow rate (190 C./2.16 kg) 3-6 g/10 min. 0.8-1.2% Maleic anhydride content, |
| C3 | An anhydride modified polyethylene commercially available from E. I. du Pont de Nemours and Company (Wilmington, DE) under the trade designation Fusabond ® E226. |
| IM1 | Polyolefin elastomer (ethylene octene copolymer) with a nominal loose talc coating, commercially available under the trade designation Engage ® 8407 with a melt flow rate (190 C./2.16 kg) 13 g/10 min from Dow Chemical Company (Midland, MI) |
| IM2 | Polyolefin elastomer (ethylene octene copolymer) with a nominal loose talc coating, commercially available under the trade designation Engage ® 8137 with a melt flow rate (190 C./2.16 kg) 13 g/10 min from Dow Chemical Company (Midland, MI) |
| IM3 | Polyolefin elastomer (ethylene octene copolymer) commercially available under the trade designation Engage ® 8100 with a melt flow rate (190 C./2.16 kg) 1 g/10 min from Dow Chemical Company (Midland MI) |
| IM4 | Commercially available from LyondellBasell, Houston, TX, under the trade designation "Hifax CA 138 A". It is a reactor TPO (thermoplastic polyolefin) manufactured using LyondellBasell's Catalloy process technology. Melt flow rate (MFI) 2.8 g/10 min (230° C./2.16 kg) |
| GB1 | 3M ™ iM16K Hi-Strength Glass Bubbles with 16,000 psi crush strength, 20 micron average diameter and 0.46 g/cc true density commercially available from 3M Company, St. Paul, MN under the trade designation "3M iM16K Hi-Strength Glass Babbles" |
| GB2 | Hollow glass microspheres commercially available from Sinosteel Maanshan Inst. of Mining Research Co. ltd. under the trade designation "Y8000" (8600 psi crush strength at 80% survival and 0.6 g/cc true density as measured by 3M using ASTM Test Method D3102-78 (1982); "DETERMINATION OF ISOSTATIC COLLAPSE STRENGTH OF HOLLOW GLASS MICROSPHERES" with exceptions. The sample size of hollow microspheres was 10 true cc. The hollow microspheres were dispersed in glycerol (20.6 g), and data reduction was automated using computer software. The 80% crush strength value reported herein is the isostatic pressure at which 20 percent by volume of the glass microbubbles collapse.) |
| HDPE | A high-density polyethylene (hard hat grade) for injection molding with melt flow rate (190 C./2.16 kg) 5 g/10 min, commercially available from BRASKEM S.A. (Sao Paolo, Brazil) under the trade designation "IE59U3" |

Test Methods

Density

Density of the molded parts was determined using the following procedure. First, the molded parts were exposed to high temperature in a oven (Nabertherm® N300/14) in order to volatilize the polymer resin. The oven was set with a temperature ramp profile to run from 200° C. to 550° C. in 5 hours. After the temperature reached 550° C., it was kept constant for 12 hours. Weight percent of glass bubbles was calculated from the known amounts of molded part before and after the burn process using the following equation:

Weight % of Glass Bubbles=(Weight of Residual Inorganics After Burn)/(Weight of Molded Material Before Burn)×100

We then determine the density of the glass bubble residue ($d_{GB}$) using a helium gas pycnometer (AccuPcy 1330 from Micromeritics). Finally, the molded part density is calculated from the known weight percent of glass bubble residue (W % GB), weight percent of polymer phase (1−w % GB), the density of glass bubble residue ($d_{GB}$) and the known polymer density ($d_{polymer}$) from supplier datasheet.

$$\rho_{molded\ part} = \frac{1}{\frac{W\ \%_{GB}}{d_{GB}} + \frac{W\ \%_{polymer}}{d_{polymer}}}$$

Mechanical Properties

Mechanical properties of the injection-molded composites were measured using ASTM standard test methods listed in Table 2. An MTS frame with a 5 kN load cell and tensile and 3 point bending grips were used for tensile and flexural properties, respectively. In tensile testing mode, the test procedure described in ASTM D-638-10 standard was followed, however no strain gauge was used, and instead, grip separation distance was used to determine the sample elongation. Tinius Olsen model 1T503 impact tester and its specimen notcher were used to measure room temperature Notched Izod impact strength of the molded parts. A Tinius Olsen MP200 extrusion plastometer was used for melt flow index testing on samples. At least 5 different specimens from a given sample were tested in all tensile, flexural, and impact tests. Arithmetic average of the results were determined and reported in the following examples. The results were observed to be highly repeatable and the standard deviation in test results was observed to be in the range of 3-5% or lower. At least two different specimens were tested in melt flow index tests. The melt flow tests were observed to be highly repeatable with almost identical experimental results. Arithmetic average of the results were determined and reported in the following examples.

TABLE 2

Property Test Methods

| Test (Unit) | Abbr. | ASTM # |
|---|---|---|
| Tensile Modulus (MPa) @ °20 C. | TM | D-638-10 |
| Tensile Strength at yield (MPa) °20 C. | TS | D-638-10 |
| Elongation at break (%) | EL | D-638-10 |
| Notched Izod Impact @ °20 C. (J/m) | NI | D-256-10 |
| Flexural Modulus (MPa) | FM | D-790-10 |

TABLE 2-continued

Property Test Methods

| Test (Unit) | Abbr. | ASTM # |
|---|---|---|
| Flexural Strength at yield (MPa) | FS | D-790-10 |
| Melt Flow Index | MFI | D-1238-13 |

Compounding Procedure

Samples were compounded in a co-rotating intermeshing 1 inch twin screw extruder (L/D: 25) equipped with 7 heating zones. Polymer pellets (polypropylene or HDPE), the impact modifier and compatibilizers were dry blended and fed in zone 1 via a resin feeder and then passed through a set of kneading blocks and conveying elements. The extrudate was cooled in a water bath and pelletized. The pelletized blend was then reintroduced through the resin feed hopper and passed through the kneading block section again to ensure its complete melting before glass bubbles were side fed downstream in zone 4. At the point of glass bubble side feeding as well as for the rest of the downstream processing, high channel depth conveying elements (OD/ID: 1.75) were used.

For polypropylene, the temperature in zone 1 was set to 150° C. and all other zones to 220° C. For HDPE, zone 1 was set to 150° C. and all others were set to 215° C. respectively. The screw rotation speed was set to 250 rpm in both cases. The extrudate was cooled in a water bath and pelletized.

Injection Molding Procedure

All samples were molded using a BOY22D injection molding machine with a 28 mm general purpose barrel and screw manufactured by Boy Machines Inc., Exton, Pa. A standard ASTM mold with cavities for tensile, flex and impact bar was used for all molded parts. The injection molded specimens were kept on a lab bench at room temperature and under ambient conditions for at least 36 hours before performing any testing.

Comparative Examples 1A-1C and Example 1

High Density Polyethylene Based Formulations

The addition of 12 wt % GB1 (0.46 g/cc) to HDPE reduces density by about 10% (compare CE1A and CE1B) but the reduction in density comes at the expense of 65% decrease in notched impact strength. The tensile strength also is reduced because there is less resin to withstand the applied forces causing yielding at lower stress levels. The benefits, on the other hand, are increased stiffness as evidenced by increased level of tensile and flex modulus.

In order to compensate for the decreased impact strength, a low viscosity Impact modifier 1 (MFI 30 g/10 min @190 C/2.16 kg) is added in CE1C. The addition of this impact modifier increases notched impact strength from 32 J/m to 37 J/m, which is still well below that of unfilled HDPE (91 J/m). The increase in impact strength comes at the expense of decreased tensile strength (from 23.3 MPa to 18 MPa due to glass bubbles and further to 14.2 MPa due to the addition of the impact modifier) and flexural strength (from 24.9 to 20.0 MPa).

When a functional compatibilizer based on polyethylene such as C2 is used along with the impact modifier, the notched impact strength further increases remarkably from 37 J/m to 120 J/m while also increasing tensile and flexural strength (CE1C and EX1).

TABLE 3

HDPE Based Formulas

| | CE1A HDPE | | CE1B HDPE with glass bubbles | | CE1C HDPE with glass bubbles and impact modifier | | EX1 HDPE with glass bubbles, impact modifier and compatibilizer | |
|---|---|---|---|---|---|---|---|---|
| | Wt % | Vol % | Wt % | Vol % | Wt % | Vol % | Wt % | Vol % |
| HDPE | 100 | 100 | 88 | 19.3 | 70.5 | 62.5 | 66.2 | 58.7 |
| GB1 | — | — | 12.0 | 20.7 | 12.0 | 20.4 | 12.0 | 20.4 |
| IM1 | — | — | — | — | 17.5 | 17.1 | 17.7 | 17.2 |
| C2 | — | — | — | — | — | — | 4.1 | 3.7 |
| Density (g/cc) | 0.959 | | 0.859 | | 0.825 | | 0.829 | |
| % Density Reduction | — | | 10.4 | | 14.0 | | 13.6 | |
| TS (Mpa) | 23.2 | | 18.0 | | 14.2 | | 20.0 | |
| TM (Mpa) | 870 | | 1415 | | 900 | | 875 | |
| EL (%) | limit | | 115 | | 200 | | 16 | |
| FS (Mpa) | 24.9 | | 27.0 | | 20.0 | | 22.4 | |
| FM (Mpa) @ 2% secant | 694 | | 872 | | 610 | | 570 | |
| NI (J/m) | 91 | | 32 | | 37 | | 120 | |
| MFI (190° C., 2.16 kg) | 7.5 | | 4.2 | | 4.8 | | 4.5 | |
| MFI/density (1/g/cc) | 7.8 | | 5.1 | | 5.6 | | 5.3 | |

Examples 2-4

Effect of Impact Modifier Viscosity and Blends in HDPE

Examples 2-4 in Table 3 show that the use of a higher MFI impact modifier such as IM1 (MFI=30) in EX1 results in a higher composite final MFI whereas a lower MFI impact modifier such as IM3 (MFI=1) in EX2 results in a lower composite final MFI.

The use of higher MFI impact modifiers in EX1 and EX3 do not affect adversely the final MFI of the composite while the lower MFI impact modifier in EX2 may adversely affect the final composite MFI. EX4 shows that one can blend a high and low MFI impact modifier for an optimized viscosity. Hence, this invention also includes those impact modifiers which are blends of high and low MFI impact modifiers.

Correct Selection of Compatibilizer

Table 4 demonstrates that the correct selection of C2 for HDPE (EX3) improves the impact strength vs. selecting C1 for HDPE (CE1B). The compatibilizer is chosen such that the back bone where the functional grafts are attached can co-crystallize and compatible with the main matrix resin.

TABLE 4

HDPE Based Formulas

| | CE1A | | EX1 | | EX2 | | EX3 | | CE1B | | CE1C | | EX4 | |
|---|---|---|---|---|---|---|---|---|---|---|---|---|---|---|
| | Wt % | Vol % | Wt % | Vol % | Wt % | Vol % | Wt % | Vol % | Wt % | Vol % | Wt % | Vol % | Wt % | Vol % |
| HDPE | 100 | 100 | 66.2 | 58.7 | 66.2 | 58.7 | 66.2 | 58.7 | 66.2 | 58.7 | 70.5 | 62.5 | 66.2 | 58.7 |
| GB1 | — | — | 12.0 | 20.4 | 12.0 | 20.4 | 12.0 | 20.4 | 12.0 | 20.4 | 12.0 | 20.4 | 12.0 | 20.4 |
| IM1 | — | — | 17.7 | 17.2 | — | — | — | — | — | — | — | — | 8.8 | 8.6 |
| IM2 | — | — | — | — | — | — | 17.7 | 17.2 | 17.7 | 17.2 | 17.5 | 17.1 | — | — |
| IM 3 | — | — | — | — | 17.7 | 17.2 | — | — | — | — | — | — | 8.9 | 8.6 |
| C2 | — | — | 4.1 | 3.7 | 4.1 | 3.7 | 4.1 | 3.7 | — | — | — | — | 4.1 | 3.7 |
| C1 | — | — | — | — | — | — | — | — | 4.1 | 3.7 | — | — | — | — |
| Density (g/cc) | 0.959 | | 0.829 | | 0.857 | | 0.852 | | 0.834 | | 0.851 | | 0.846 | |
| % Reduction | — | | 13.6 | | 10.6 | | 11.2 | | 13.0 | | 11.2 | | 11.8 | |
| TS (Mpa) | 23.2 | | 20.0 | | 18.0 | | 18.0 | | 13.0 | | 13.1 | | 18.3 | |
| TM (Mpa) | 870 | | 875 | | 800 | | 858 | | 700 | | 765 | | 870 | |
| EL (%) | limit | | 16 | | 36 | | 40 | | Limit | | Limit | | 34 | |
| FS (Mpa) | 24.9 | | 22.4 | | 20.0 | | 19.7 | | 16.8 | | 18.0 | | 20.1 | |
| FM (Mpa) @ 2% secant | 694 | | 570 | | 560 | | 562 | | 487 | | 570 | | 575 | |
| NI (J/m) | 91 | | 120 | | 362 | | 275 | | 43 | | 65 | | 227 | |
| MFI (190 C. 2.16 kg) | 7.5 | | 4.5 | | 2.6 | | 4.3 | | 3.5 | | 4.5 | | 3.6 | |
| MFI/density (1/g/cc) | 7.8 | | 5.4 | | 3.0 | | 5.0 | | 4.2 | | 5.4 | | 4.3 | |

Example 5 and Comparative Examples 2A-2C

Low Impact Polypropylene Homopolymer Based Formulations

As seen in Table 4, similar to that seen with HDPE, the addition of glass bubbles to polypropylene homopolymer reduces density by about 9.3% (compare CE2A and CE2B) but the reduction in density comes at the expense of about a 50% decrease in notched impact strength.

In order to compensate for the decreased impact strength, a low viscosity impact modifier Impact modifier 1 (MFI 30 g/10 min @190 C/2.16 kg) is added in CE2C. The addition of this impact modifier increases the notched impact strength 87% from 24.7 to 46.3 J/m. The increase in impact strength comes at the expense of decreased tensile strength (from 29.2 MPa to 19.3 MPa due to glass bubbles and further down to 13.9 MPa due to the addition of the impact modifier) and flexural strength (from 37.6 to 23.8 MPa).

When a functional compatibilizer based on polypropylene (C1) is used along with the impact modifier, the notched impact strength further is further increased from 46.3 J/m to 60 Jim while also increasing tensile and flexural strength (compare 3 and 4).

TABLE 5

Low Impact Polypropylene Homopolymer Based Formulations

|  | CE2A | | CE2B | | CE2C | | EX5 | |
|---|---|---|---|---|---|---|---|---|
|  | Wt % | Vol % | Wt % | Vol % | Wt % | Vol % | Wt % | Vol % |
| PP1 | 100 | 100 | 90 | 78 | 69 | 62 | 65 | 58.3 |
| GB1 | — | — | 14 | 22 | 14 | 22 | 14 | 22.0 |
| C1 | — | — | — | — | — | — | 4 | 3.6 |
| IM1 | — | — | — | — | 17 | 16 | 17 | 16.1 |
| Density (g/cc) | 0.9 | | 0.816 | | 0.802 | | 0.801 | |
| TS(Mpa) | 29.2 | | 19.3 | | 13.9 | | 19.1 | |
| TM (Mpa) | 1190 | | 1690 | | 900 | | 1180 | |
| EL (Mpa) | limit | | 140 | | limit | | 14 | |
| FS (Mpa) | 37.6 | | 34.5 | | 23.8 | | 28.9 | |
| FM (Mpa) @ 1% secant | 1063 | | 1575 | | 970 | | 1075 | |
| NI (J/m) | 48 | | 24.7 | | 46.3 | | 60.0 | |
| MFI (210° C. 2.16 kg) | 4.7 | | 2.3 | | 3.8 | | 4.7 | |
| MFI/density (1/g/cc) | 5.2 | | 2.8 | | 4.7 | | 5.9 | |

Examples 6-8

Effect of Impact Modifier Viscosity and Blends in Low Impact Polypropylene

As seen in Table 5 the use of a higher MFI impact modifier such as IM1 (MFI=30) in EX5 results in a final composite MFI of 5.5 whereas a lower MFI impact modifier such as IM3 (EX7) results in a final composite MFI of 2.9.

The use of higher MFI impact modifiers EX5 and EX63 do not affect adversely the final MFI of the composite. EX8 shows that one can blend a high and low MFI impact modifier for an optimized viscosity.

TABLE 6

Low Impact Polypropylene Homopolymer Based Formulations

|  | CE2A | | EX5 | | EX6 | | EX7 | | EX8 | |
|---|---|---|---|---|---|---|---|---|---|---|
|  | Wt % | Vol % | Wt % | Vol % | Wt % | Vol % | Wt % | Vol % | Wt % | Vol % |
| PP1 | 100 | 100 | 65 | 58.3 | 65 | 58.3 | 65 | 58.3 | 65 | 58.3 |
| GB1 | — | — | 14 | 22.0 | 14 | 22.0 | 14 | 22.0 | 14 | 22.0 |
| C1 | — | — | 4 | 3.6 | 4 | 3.6 | 4 | 3.6 | 4 | 3.6 |
| IM1 | — | — | 17 | 16.1 | — | — | — | — | 8.5 | 8.05 |
| IM2 | — | — | — | — | 17 | 16.1 | — | — | — | — |
| IM3 | — | — | — | — | — | — | 17 | 16.1 | 8.5 | 8.05 |
| Density (g/cc) | 0.9 | | 0.801 | | 0.797 | | 0.798 | | 0.798 | |
| TS (Mpa) | 29.2 | | 19.1 | | 20.8 | | 22.0 | | 21.9 | |
| TM (Mpa) | 1190 | | 1180 | | 1170 | | 1228 | | 1207 | |
| EL (MPa) | limit | | 14 | | 26 | | 25 | | 29 | |
| FS (Mpa) | 37.6 | | 28.9 | | 29.4 | | 31.4 | | 30.3 | |
| FM (Mpa) @ 1% secant | 1063 | | 1075 | | 1030 | | 1090 | | 1050 | |
| NI (J/m) | 48 | | 60.0 | | 87 | | 125 | | 85 | |
| MFI (210° C. 2.16 kg) | 4.7 | | 5.5 | | 4.4 | | 2.9 | | 3.9 | |

TABLE 6-continued

| | Low Impact Polypropylene Homopolymer Based Formulations | | | | | | | | |
|---|---|---|---|---|---|---|---|---|---|
| | CE2A | | EX5 | | EX6 | | EX7 | | EX8 |
| | Wt % | Vol % | Wt % | Vol % | Wt % | Vol % | Wt % | Vol % | Wt % | Vol % |
| MFI/density (1/g/cc) | 5.2 | | 6.9 | | 5.5 | | 3.6 | | 4.9 |

Example 9 and Comparative Examples 3A-3C

Medium Impact Polypropylene Copolymer Based Formulations

In example 9, we demonstrate that the same effect is observed in a medium impact polypropylene as in a low impact polypropylene (increasing impact strength while increasing tensile and flex strength.

The addition of glass bubbles reduces density by about 9.3% (compare CE3A and CE3B) but the reduction in density comes at the expense of about a 55% decrease in notched impact strength.

In order to compensate for the decreased impact strength, a low viscosity impact modifier IM1 (MFR 30 g/10 min @190° C./2.16 kg) is added in CE3C. The addition of this impact modifier increases the notched impact strength 146% from 37.6 to 92.7 J/m. The increase in impact strength comes at the expense of decreased tensile strength (from 26.6 MPa to 16.5 MPa due to glass bubbles and further down to 12.7 MPa due to the addition of the impact modifier) and flexural strength (from 34.6 to 29.3 MPa).

When a functional compatibilizer is used along with the impact modifier, the notched impact strength further is further increased from 92.7 J/m to 122 J/m while also increasing tensile and flexural strength (compare formula CE3C and Ex9).

Example 10 and Comparative Examples CE4A-4C

High Impact Polypropylene Copolymer Based Formulations

Several automobile plastics use high impact polypropylenes (especially in exteriors) and weight reduction with glass bubbles has had a harder time penetrating into parts that require high impact. In example 10, we demonstrate that this invention is also applicable in high impact polymers and could help meet specifications that require high impact. Note that we are using 14 wt % GB1 alone and that reinforcing fillers such as talc and glass fibers can easily be added to reinforce these current formulas and increase modulus and strength further.

In high impact polypropylene, the notched impact strength reduction is significant at 87% from 545 J/m to 65 J/m. We are significantly recovering impact strength up to 215 J/m with no detriment on density. In example 10, we demonstrate that the combined low viscosity non-functionalized impact modifier and functional compatibilizer also shows the same improvement of increasing impact strength while increasing tensile and flex strength.

TABLE 8

| | High Impact Polypropylene Copolymer Based Formulations | | | | | | | |
|---|---|---|---|---|---|---|---|---|
| | CE4A | | CE4B | | CE4C | | EX 10 | |
| | Wt % | Vol % | Wt % | Vol % | Wt % | Vol % | Wt % | Vol % |
| PP3 | 100 | 100 | 90 | 78 | 69 | 62 | 65 | 58.3 |
| GB1 | — | — | 14 | 22 | 14 | 22 | 14 | 22.0 |
| C1 | — | — | — | — | — | — | 4 | 3.6 |
| IM1 | — | — | — | — | — | — | 17 | 16.1 |

TABLE 7

| | Medium Impact Polypropylene Copolymer Based Formulations | | | | | | | |
|---|---|---|---|---|---|---|---|---|
| | CE3A | | CE3B | | CE3C | | EX9 | |
| | Wt % | Vol % | Wt % | Vol % | Wt % | Vol % | Wt % | Vol % |
| PP2 | 100 | 100 | 90 | 78 | 69 | 62 | 65 | 58.3 |
| GB1 | — | — | 14 | 22 | 14 | 22 | 14 | 22.0 |
| C1 | — | — | — | — | — | — | 4 | 3.6 |
| IM1 | — | — | — | — | 17 | 16 | 17 | 16.1 |
| Density (g/cc) | 0.9 | | 0.803 | | 0.799 | | 0.797 | |
| TS (Mpa) | 26.6 | | 16.5 | | 12.7 | | 16.6 | |
| TM (Mpa) | 1083 | | 1390 | | 830 | | 1031 | |
| EL (Mpa) | limit | | limit | | limit | | 25.6 | |
| FS (Mpa) | 34.5 | | 29.3 | | 19.8 | | 24.9 | |
| FM (Mpa) @ 1% secant | 1151 | | 1405 | | 885 | | 1006 | |
| NI (J/m) | 84.1 | | 37.6 | | 92.7 | | 122.0 | |
| MFI (210° C. 2.16 kg) | 4 | | 2.55 | | 2.75 | | 3.8 | |
| MFI/density (1/g/cc) | 4.5 | | 3.2 | | 3.4 | | 4.8 | |

TABLE 8-continued

High Impact Polypropylene Copolymer Based Formulations

|  | CE4A | | CE4B | | CE4C | | EX 10 | |
| --- | --- | --- | --- | --- | --- | --- | --- | --- |
|  | Wt % | Vol % | Wt % | Vol % | Wt % | Vol % | Wt % | Vol % |
| Density (g/cc) | 0.89 | | 0.803 | | 0.806 | | 0.800 | |
| TS (Mpa) | 20.6 | | 13.1 | | 11.5 | | 14.0 | |
| TM (Mpa) | 823 | | 1307 | | 748 | | 851 | |
| EL (Mpa) | limit | | 70 | | limit | | 45 | |
| FS (Mpa) | 27.2 | | 23.6 | | 15.8 | | 20.4 | |
| FM (Mpa) @ 1% secant | 912 | | 1240 | | 792 | | 820 | |
| NI (J/m) | 545 | | 66 | | 180 | | 215 | |
| MFI (210° C. 2.16 kg) | 4 | | 2.35 | | 2.2 | | 3.25 | |
| MFI/density (1/g/cc) | 4.5 | | 2.9 | | 2.7 | | 4.1 | |

Example 11 and Comparative Examples 5A-5D

Effect of Impact Modifier Viscosity and Blends in High Impact Polypropylene

TABLE 9

High Impact Polypropylene Homopolymer Based Formulations

|  | CE5A | | CE5B | | CE5C | | CE5D | | EX 11 | |
| --- | --- | --- | --- | --- | --- | --- | --- | --- | --- | --- |
|  | Wt % | Vol % | Wt % | Vol % | Wt % | Vol % | Wt % | Vol % | Wt % | Vol % |
| PP3 | 100 | 100 | 65 | 58.3 | 65 | 58.3 | 65 | 58.3 | 65 | 58.3 |
| GB1 | — | — | 14 | 22.0 | 14 | 22.0 | 14 | 22.0 | 14 | 22.0 |
| C1 | — | — | 4 | 3.6 | 4 | 3.6 | 4 | 3.6 | 4 | 3.6 |
| IM1 | — | — | 17 | 16.1 | — | — | — | — | 8.5 | 8.05 |
| IM2 | — | — | — | — | 17 | 16.1 | — | — | — | — |
| IM3 | — | — | — | — | — | — | 17 | 16.1 | 8.5 | 8.05 |
| Density (g/cc) | 0.89 | | 0.800 | | 0.792 | | 0.792 | | 0.793 | |
| TS (Mpa) | 20.6 | | 14.0 | | 14.2 | | 15.0 | | 14.8 | |
| TM (Mpa) | 823 | | 850 | | 875 | | 900 | | 880 | |
| EL (Mpa) | limit | | 45 | | 59 | | 60 | | 64 | |
| FS (Mpa) | 27.2 | | 20.4 | | 20.0 | | 20.9 | | 20.4 | |
| FM (Mpa) @ 1% secant | 912 | | 820 | | 1030 | | 1090 | | 1050 | |
| NI (J/m) | 545 | | 215 | | 275 | | 318 | | 295 | |
| MFI (210° C. 2.16 kg) | 4 | | 3.3 | | 3.1 | | 2.4 | | 2.6 | |
| MFI/density (1/g/cc) | 4.5 | | 4.1 | | 3.9 | | 3.0 | | 3.3 | |

Comparative Examples 6A-6F

Compatibilizer Only
Using Compatibilizer Alone without Impact Modifier
Table 10, the presence of compatibilizers does not significantly change notched impact strength significantly neither in low, medium, or high impact polymers.

TABLE 10

Effect of using Compatibilizer only without the Impact Modifier

|  | CE6A | | CE6B | | CE6C | | CE6D | | CE6E | | CE6F | |
| --- | --- | --- | --- | --- | --- | --- | --- | --- | --- | --- | --- | --- |
|  | Wt % | Vol % | Wt % | Vol % | Wt % | Vol % | Wt % | Vol % | Wt % | Vol % | Wt % | Vol % |
| PP1 | 90 | 78 | 81 | 73.5 | | | | | | | | |
| PP2 | | | | | 90 | 78 | 81 | 73.5 | | | | |
| PP3 | | | | | | | | | 90 | 78 | 81 | 73.5 |
| GB1 | 14 | 22 | 14 | 22 | 14 | 22 | 14 | 22 | 14 | 22 | 14 | 22 |
| C1 | — | — | 5 | 4.5 | — | — | 5 | 4.5 | — | — | 5 | 4.5 |
| Density (g/cc) | 0.816 | | 0.795 | | 0.803 | | 0.795 | | 0.803 | | 0.800 | |
| TS (Mpa) | 19.3 | | 30.0 | | 16.5 | | 24.5 | | 13.1 | | 19.5 | |
| TM (Mpa) | 1690 | | 1760 | | 1390 | | 1647 | | 1307 | | 1349 | |
| EL (Mpa) | 140 | | 5 | | limit | | 4.8 | | 70 | | 14 | |
| FS (Mpa) | 34.5 | | 43.9 | | 29.3 | | 37.3 | | 23.6 | | 30.2 | |

TABLE 10-continued

Effect of using Compatibilizer only without the Impact Modifier

|  | CE6A | | CE6B | | CE6C | | CE6D | | CE6E | | CE6F | |
|---|---|---|---|---|---|---|---|---|---|---|---|---|
|  | Wt % | Vol % | Wt % | Vol % | Wt % | Vol % | Wt % | Vol % | Wt % | Vol % | Wt % | Vol % |
| FM (Mpa) @ 1% secant | 1575 | | 1525 | | 1405 | | 1467 | | 1240 | | 1365 | |
| NI (J/m) | 24.7 | | 33.4 | | 37.6 | | 47.1 | | 66.2 | | 64.1 | |
| MFI (210° C. 2.16 kg) | 2.3 | | 2.6 | | 2.55 | | 3.0 | | 2.35 | | 3.15 | |
| MFI/density (1/g/cc) | 2.8 | | 3.3 | | 3.2 | | 3.8 | | 2.9 | | 3.9 | |

Comparative Examples 7A-7F and Example 12

Correct Selection of Compatibilizers

Table 11 demonstrates that the correct selection of C1 for PP1 (EX12) improves the impact strength vs. selecting C2 for PP1 (CE7E). The compatibilizer is chosen such that the back bone where the functional grafts are attached can co-crystallize and compatible with the main matrix resin.

TABLE 11

|  | CE7A | | CE7B | | CE7C | | CE7D | | CE7E | | CE7F | | EX 12 | |
|---|---|---|---|---|---|---|---|---|---|---|---|---|---|---|
|  | Wt % | Vol % | Wt % | Vol % | Wt % | Vol % | Wt % | Vol % | Wt % | Vol % | Wt % | Vol % | Wt % | Vol % |
| PP1 | 100 | 100 | 90 | 78 | 69 | 62 | 81 | 73.6 | 65 | 58.5 | 81 | 73.5 | 65 | 58.3 |
| GB1 | — | — | 14 | 22 | 14 | 22 | 14 | 22 | 14 | 22.0 | 14 | 22 | 14 | 22.0 |
| C1 | — | — | — | — | — | — | — | — | — | — | 5 | 4.5 | 4 | 3.6 |
| C2 | — | — | — | — | — | — | 5 | 4.4 | 4 | 3.5 | — | — | — | — |
| IM1 | — | — | — | — | 17 | 16 | — | — | 17 | 16.0 | — | — | 17 | 16.1 |
| Density (g/cc) | 0.9 | | 0.816 | | 0.802 | | 0.814 | | 0.808 | | 0.795 | | 0.801 | |
| TS (Mpa) | 29.2 | | 19.3 | | 13.9 | | 25.1 | | 16.1 | | 30.0 | | 19.1 | |
| TM (Mpa) | 1190 | | 1690 | | 900 | | 1650 | | 930 | | 1760 | | 1180 | |
| EL (Mpa) | limit | | 140 | | limit | | 5 | | 57 | | 5 | | 14 | |
| FS (Mpa) | 37.6 | | 34.5 | | 23.8 | | 40.2 | | 26.1 | | 43.9 | | 28.9 | |
| FM (Mpa) @ 1% secant | 1063 | | 1575 | | 970 | | 1630 | | 830 | | 1525 | | 1075 | |
| NI (J/m) | 48 | | 24.7 | | 46.3 | | 23.8 | | 44.7 | | 33.4 | | 60.0 | |
| MFI (210° C. 2.16 kg) | 4.0 | | 2.3 | | 3.8 | | 2.3 | | 4.3 | | 2.6 | | 4.7 | |
| MFI/density (1/g/cc) | 4.4 | | 2.8 | | 4.7 | | 2.8 | | 5.3 | | 3.3 | | 5.9 | |

Example 13 and Comparative Examples 8A-8C

Alternate Glass Bubble

Table 12 Formulations were similar to those in Table 3 except that an alternate glass bubble was used. As Table 12 demonstrates the impact strength of the composite is again improved with the combination of the impact modifier and correct compatibilizer (EX13).

TABLE 12

|  | CE8A | | CE8B | | CE8C | | EX 13 | |
|---|---|---|---|---|---|---|---|---|
|  | Wt % | Vol % | Wt % | Vol % | Wt % | Vol % | Wt % | Vol % |
| HDPE | 100 | 100 | 88 | 20.7 | 72.5 | 70.0 | 66.2 | 63.7 |
| GB2 | — | — | 10 | 79.3 | 10.0 | 11.5 | 12 | 13.8 |
| IM | — | — | — | — | 17.5 | 18.4 | 17.7 | 18.6 |
| C2 | — | — | — | — | — | — | 4.1 | 4.0 |
| Density (g/cc) | 0.959 | | 0.939 | | 0.926 | | 0.923 | |
| % Reduction in Density | — | | 2 | | 3.4 | | 3.8 | |
| TS (Mpa) | 24.1 | | 23.2 | | 17.2 | | 18.8 | |
| EL (%) | 160 | | 18 | | 76 | | 47 | |
| TM (Mpa) | 973 | | 1430 | | 804 | | 781 | |
| FS (Mpa) | 26.0 | | 29.5 | | 21.2 | | 21.3 | |
| FM @ 2% secant (Mpa) | 714 | | 864 | | 577 | | 588 | |
| FM @ 1% secant (Mpa) | 920 | | 1133 | | 732 | | 740 | |
| NI (J/m) | 91 | | 39 | | 71 | | 112 | |
| MFI (190° C. 2.16 kg) | 7.5 | | 5.25 | | 6.05 | | 6.25 | |
| MFI/density (1/g/cc) | 7.8 | | 5.6 | | 6.5 | | 6.8 | |

Examples 14, 15, 16 and Comparative Examples 9A-9C

TABLE 13

|  | CE9A | | CE9B | | CE9C | | EX 14 | | EX 15 | | EX 16 | |
| --- | --- | --- | --- | --- | --- | --- | --- | --- | --- | --- | --- | --- |
|  | Wt % | Vol % | Wt % | Vol % | Wt % | Vol % | Wt % | Vol % | Wt % | Vol % | Wt % | Vol % |
| PP4 | 100 | 100 | 90 | 78 | 69 | 62 | 65 | 58.3 | 65 | 58.3 | 65 | 58.3 |
| GB1 | — | — | 14 | 22 | 14 | 22 | 14 | 22.0 | 14 | 22.0 | 14 | 22.0 |
| C1 | — | — | — | — | — | — | 4 | 3.6 | 4 | 3.6 | 4 | 3.6 |
| IM3 | — | — | — | — | — | — | — | — | — | — | 17 | 16.1 |
| IM2 | — | — | — | — | — | — | — | — | 17 | 16.1 | — | — |
| IM1 | — | — | — | — | 17 | 16 | 17 | 16.1 | — | — | — | — |
| Density (g/cc) | 0.90 | | 0.814 | | 0.813 | | 0.815 | | 0.815 | | 0.815 | |
| TS (Mpa) | 21.6 | | 13.0 | | 10.6 | | 15.2 | | 15.0 | | 15.6 | |
| TM (Mpa) | 906 | | 1186 | | 778 | | 866 | | 810 | | 810 | |
| EL % | Limit | | 134 | | Limit | | 60 | | 80 | | 80 | |
| Flexural Strength (Mpa) | 27.9 | | 22.7 | | 15.7 | | 21.7 | | 21.1 | | 21.6 | |
| FM @1% Secant (Mpa) | 915 | | 1209 | | 812 | | 883 | | 848 | | 853 | |
| NI (J/m) | 205 | | 47 | | 120 | | 273 | | 311 | | 397 | |
| MFI (230° C. 2.16 kg) | 8.7 | | 5.3 | | 4.6 | | 5.3 | | 5.0 | | 4.2 | |
| MFI/density (1/g/cc) | 9.7 | | 6.5 | | 5.7 | | 6.5 | | 6.1 | | 5.2 | |

Examples 17, 18, 19 and Comparative Examples 10A-10C

TABLE 14

|  | CE10A | | CE10B | | CE10C | | EX 17 | | EX 18 | | EX 19 | |
| --- | --- | --- | --- | --- | --- | --- | --- | --- | --- | --- | --- | --- |
|  | Wt % | Vol % | Wt % | Vol % | Wt % | Vol % | Wt % | Vol % | Wt % | Vol % | Wt % | Vol % |
| PP 5 | 100 | 100 | 90 | 78 | 69 | 62 | 65 | 58.3 | 65 | 58.3 | 65 | 58.3 |
| GB1 | — | — | 14 | 22 | 14 | 22 | 14 | 22.0 | 14 | 22.0 | 14 | 22.0 |
| C1 | — | — | — | — | — | — | 4 | 3.6 | 4 | 3.6 | 4 | 3.6 |
| IM3 | — | — | — | — | — | — | — | — | — | — | 17 | 16.1 |
| IM2 | — | — | — | — | — | — | — | — | 17 | 16.1 | — | — |
| IM1 | — | — | — | — | 17 | 16 | 17 | 16.1 | — | — | — | — |
| Density (g/cc) | 0.90 | | 0.814 | | 0.812 | | 0.816 | | 0.817 | | 0.820 | |
| TS (Mpa) | 21.5 | | 12.3 | | 9.7 | | 14.0 | | 13.8 | | 14.3 | |
| TM (Mpa) | 1051 | | 1353 | | 856 | | 846 | | 844 | | 840 | |
| EL % | Limit | | 40 | | 138 | | 45 | | 42 | | 36 | |
| FS (Mpa) | 27.9 | | 22.7 | | 15.7 | | 21.7 | | 21.1 | | 21.6 | |
| FM @ % secant (Mpa) | 1056 | | 1334 | | 842 | | 837 | | 824 | | 837 | |
| NI (J/m) notched D256 | 151 | | 43 | | 117 | | 263 | | 300 | | 320 | |
| MFI (230° C. 2.16 kg) | 20.6 | | 10.7 | | 10.2 | | 10.3 | | 9 | | 6.8 | |
| MFI/density (1/g/cc) | 22.9 | | 13.1 | | 12.6 | | 12.6 | | 11.0 | | 8.3 | |

Examples 20, 21, 22 and Comparative Examples 11A-11C

TABLE 15

|  | CE11A | | CE11B | | CE11C | | EX 20 | | EX 21 | | EX 22 | |
| --- | --- | --- | --- | --- | --- | --- | --- | --- | --- | --- | --- | --- |
|  | Wt % | Vol % | Wt % | Vol % | Wt % | Vol % | Wt % | Vol % | Wt % | Vol % | Wt % | Vol % |
| PP 6 | 100 | 100 | 90 | 78 | 69 | 62 | 65 | 58.3 | 65 | 58.3 | 65 | 58.3 |
| GB1 | — | — | 14 | 22 | 14 | 22 | 14 | 22.0 | 14 | 22.0 | 14 | 22.0 |
| C1 | — | — | — | — | — | — | 4 | 3.6 | 4 | 3.6 | 4 | 3.6 |
| IM3 | — | — | — | — | — | — | — | — | — | — | 17 | 16.1 |
| IM2 | — | — | — | — | — | — | — | — | 17 | 16.1 | — | — |
| IM1 | — | — | — | — | 17 | 16 | 17 | 16.1 | — | — | — | — |
| Density (g/cc) | 0.90 | | 0.810 | | 0.813 | | 0.815 | | 0.817 | | 0.815 | |
| TS (Mpa) | 18.8 | | 11.1 | | 8.6 | | 12.6 | | 12.8 | | 13.0 | |
| TM (Mpa) | 917 | | 1245 | | 802 | | 782 | | 780 | | 776 | |
| EL % | 51 | | 20 | | 70 | | 23 | | 28 | | 18.5 | |
| FS (Mpa) | 27.9 | | 22.7 | | 14.9 | | 19.4 | | 19.3 | | 19.7 | |
| FM @ % secant (Mpa) | 940 | | 1205 | | 790 | | 810 | | 800 | | 800 | |
| NI (J/m) notched D256 | 168 | | 46 | | 126 | | 200 | | 265 | | 276 | |
| MFI (230° C. 2.16 kg) | 36.6 | | 18.1 | | 14.7 | | 14.7 | | 13.4 | | 10.2 | |
| MFI/density (1/g/cc) | 40.7 | | 22.3 | | 18.1 | | 18.0 | | 16.4 | | 12.5 | |

Examples 23, 24, 25 and Comparative Examples 12A-12C

TABLE 16

|  | CE12A | | CE12B | | CE12C | | EX 23 | | EX 24 | | EX 25 | |
| --- | --- | --- | --- | --- | --- | --- | --- | --- | --- | --- | --- | --- |
|  | Wt % | Vol % | Wt % | Vol % | Wt % | Vol % | Wt % | Vol % | Wt % | Vol % | Wt % | Vol % |
| PP 7 | 100 | 100 | 90 | 78 | 69 | 62 | 65 | 58.3 | 65 | 58.3 | 65 | 58.3 |
| GB1 | — | — | 14 | 22 | 14 | 22 | 14 | 22.0 | 14 | 22.0 | 14 | 22.0 |
| C1 | — | — | — | — | — | — | 4 | 3.6 | 4 | 3.6 | 4 | 3.6 |
| IM3 | — | — | — | — | — | — | — | — | — | — | 17 | 16.1 |
| IM2 | — | — | — | — | — | — | — | — | 17 | 16.1 | — | — |
| IM1 | — | — | — | — | 17 | 16 | 17 | 16.1 | — | — | — | — |
| Density (g/cc) | 0.90 | | 0.817 | | 0.818 | | 0.812 | | 0.823 | | 0.820 | |
| TS (Mpa) | 18.2 | | 11.1 | | 8.9 | | 12.6 | | 12.8 | | 12.9 | |
| TM (Mpa) | 917 | | 1245 | | 802 | | 782 | | 780 | | 776 | |
| EL % | 30 | | 13 | | 52 | | 23 | | 22 | | 14 | |
| FS (Mpa) | 26.0 | | 20.7 | | 15.0 | | 19.2 | | 19.0 | | 19.4 | |
| FM @ % secant (Mpa) | 866 | | 1119 | | 761 | | 788 | | 767 | | 786 | |
| NI (J/m) notched D256 | 128 | | 41 | | 125 | | 260 | | 300 | | 250 | |
| MFI (230° C. 2.16 kg) | 55 | | 27 | | 22 | | 17.6 | | 18.5 | | 13.1 | |
| MFI/density (1/g/cc) | 61.1 | | 33.0 | | 26.9 | | 21.7 | | 22.5 | | 16.0 | |

Examples 26, 27, 28 and Comparative Examples 13A-13U

TABLE 17

|  | CE13A | | CE13B | | CE13C | | EX 26 | | EX 27 | | EX 28 | |
| --- | --- | --- | --- | --- | --- | --- | --- | --- | --- | --- | --- | --- |
|  | Wt % | Vol % | Wt % | Vol % | Wt % | Vol % | Wt % | Vol % | Wt % | Vol % | Wt % | Vol % |
| PP 8 | 100 | 100 | 90 | 78 | 69 | 62 | 65 | 58.3 | 65 | 58.3 | 65 | 58.3 |
| GB1 | — | — | 14 | 22 | 14 | 22 | 14 | 22.0 | 14 | 22.0 | 14 | 22.0 |
| C1 | — | — | — | — | — | — | 4 | 3.6 | 4 | 3.6 | 4 | 3.6 |

TABLE 17-continued

|  | CE13A | | CE13B | | CE13C | | EX 26 | | EX 27 | | EX 28 | |
|---|---|---|---|---|---|---|---|---|---|---|---|---|
|  | Wt % | Vol % | Wt % | Vol % | Wt % | Vol % | Wt % | Vol % | Wt % | Vol % | Wt % | Vol % |
| IM3 | — | — | — | — | — | — | — | — | — | — | 17 | 16.1 |
| IM2 | — | — | — | — | — | — | — | — | 17 | 16.1 | — | — |
| IM1 | — | — | — | — | 17 | 16 | 17 | 16.1 | — | — | — | — |
| Density (g/cc) | 0.90 | | 0.824 | | 0.817 | | 0.815 | | 0.823 | | 0.822 | |
| TS (Mpa) | 15.9 | | 10.0 | | 8.8 | | 10.2 | | 10.0 | | 10.5 | |
| TM (Mpa) | 846 | | 993 | | 530 | | 640 | | 578 | | 577 | |
| EL % | 33 | | 34 | | 130 | | 52 | | 71 | | 83 | |
| FS (Mpa) | 19.9 | | 14.9 | | 12.3 | | 14.3 | | 13.8 | | 14.3 | |
| FM @ % secant (Mpa) | 747 | | 780 | | 534 | | 590 | | 558 | | 573 | |
| NI (J/m) notched D256 | 660 | | 153 | | 125 | | 381 | | 423 | | 455 | |
| MFI (230° C. 2.16 kg) | 18.9 | | 8.6 | | 8.8 | | 8.4 | | 8.8 | | 6.7 | |
| MFI/density (1/g/cc) | 21.0 | | 10.4 | | 10.8 | | 10.3 | | 10.7 | | 8.2 | |

Example 29 and Comparative Examples 13A, 13B, 14A

TABLE 18

|  | CE13A | | CE13B | | CE14A | | EX 29 | |
|---|---|---|---|---|---|---|---|---|
|  | Wt % | Vol % | Wt % | Vol % | Wt % | Vol % | Wt % | Vol % |
| PP 8 | 100 | 100 | 90 | 78 | 70 | 63 | 66 | 59.4 |
| GB1 | — | — | 14 | 22 | 13 | 21 | 13 | 21.1 |
| C1 | — | — | — | — | — | — | 4 | 3.6 |
| IM4 | — | — | — | — | 17 | 16 | 17 | 15.9 |
| Density (g/cc) | 0.90 | | 0.824 | | 0.819 | | 0.824 | |
| TS (Mpa) | 15.9 | | 10.0 | | 9.1 | | 13.6 | |
| TM (Mpa) | 846 | | 993 | | 864 | | 865 | |
| EL % | 33 | | 34 | | 35 | | 30 | |
| FS (Mpa) | 19.9 | | 14.9 | | 14.9 | | 19.4 | |
| FM @ % secant (Mpa) | 747 | | 780 | | 779 | | 802 | |
| NI (J/m) notched D256 | 660 | | 153 | | 233 | | 316 | |
| MFI (230° C. 2.16 kg) | 18.9 | | 8.6 | | 5.3 | | 5.8 | |
| MFI/density (1/g/cc) | 21.0 | | 10.4 | | 6.5 | | 7.0 | |

Example 30 and Comparative Examples 13A, 13B and 15A

Correct Selection of Compatibilizers

Table 19 demonstrates that the correct selection of C1 for PP7 (EX30) improves the impact strength vs. selecting C2 for PP7(CE15A). The compatibilizer is chosen such that the back bone where the functional grafts are attached can co-crystallize and compatible with the main matrix resin.

TABLE 19

|  | CE13A | | CE13B | | EX 30 | | CE15A | |
|---|---|---|---|---|---|---|---|---|
|  | Wt % | Vol % | Wt % | Vol % | Wt % | Vol % | Wt % | Vol % |
| PF 7 | 100 | 100 | 90 | 78 | 65 | 58.3 | 64.7 | 58.2 |
| GB1 | — | — | 14 | 22 | 14.0 | 22.0 | 14.0 | 22.2 |
| C1 | — | — | — | — | 4.0 | 3.6 | — | — |
| C2 | — | — | — | — | — | — | 4.0 | 3.4 |
| IM2 | — | — | — | — | 17 | 16.1 | 17.3 | 16.2 |
| Density (g/cc) | 0.90 | | 0.817 | | 0.823 | | 0.813 | |
| TS (Mpa) | 18.2 | | 11.1 | | 12.8 | | 9.6 | |
| TM (Mpa) | 917 | | 1245 | | 780 | | 590 | |
| EL % | 30 | | 13 | | 22 | | 43 | |
| FS (Mpa) | 26.0 | | 20.7 | | 19.0 | | 14.4 | |
| FM @ % secant (Mpa) | 866 | | 1119 | | 767 | | 543 | |
| NI (J/m) notched D256 | 128 | | 41 | | 300 | | 89 | |
| MFI (230° C. 2.16 kg) | 55 | | 27 | | 18.5 | | 18.4 | |
| MFI/density (1/g/cc) | 61.1 | | 33.0 | | 22.5 | | 22.6 | |

Example 31, 32 and Comparative Examples 13A, 13B and 1SB

Preferred Amount of Compatibilizers

Table 20 demonstrates that the preferred amount of compatibilizer for PP7 (EX30 and EX31) shows improved impact strength whereas lower amounts (CE15A) lower the impact strength compared to unfilled control resin CE13A and impact modifier containing with 0% compatibilizers only (CE12C) shown above. Preferred amount is between 2 and 4%.

Comparative Examples CE2A, CE17A, CE17B, CE17C, CE17D, CE2C and EX5

Effect of Compatibilizer in the Absence of Glass Bubbles

Comparing CE17A to CE17B, one can see that the addition of compatibilizer to a compound with 20% polyolefin elastomer does not result in further enhancement of the impact strength. In fact there is a slight reduction of impact strength.

Comparison of CE17A to CE17B also shows that compatibilizer have a neutral to negligible improvement (4% increase) effect on the impact strength of a compound that contains 15.5 wt %/impact modifier.

TABLE 20

| Component | CE13A Wt % | CE13A Vol % | CE13B Wt % | CE13B Vol % | EX 30 Wt % | EX 30 Vol % | EX 31 Wt % | EX 31 Vol % | CE15B Wt % | CE15B Vol % |
|---|---|---|---|---|---|---|---|---|---|---|
| PP7 | 100 | 100 | 90 | 78 | 65 | 58.3 | 66.7 | 60.2 | 67.8 | 60.8 |
| GB1 | — | — | 14 | 22 | 14.0 | 22.0 | 14.0 | 21.8 | 14.0 | 22.2 |
| C1 | — | — | — | — | 4.0 | 3.6 | 2.1 | 1.9 | 1.1 | 0.9 |
| IM2 | — | — | — | — | 17 | 16.1 | 17.2 | 16.1 | 17.2 | 16.0 |
| Density (g/cc) | 0.90 | | 0.817 | | 0.823 | | 0.811 | | 0.811 | |
| TS (Mpa) | 18.2 | | 11.1 | | 12.8 | | 12.6 | | 11.9 | |
| TM (Mpa) | 917 | | 1245 | | 780 | | 800 | | 777 | |
| EL % | 30 | | 13 | | 22 | | 25 | | 28 | |
| FS (Mpa) | 26.0 | | 20.7 | | 19.0 | | 17.9 | | 17.1 | |
| FM @ % secant (Mpa) | 866 | | 1119 | | 767 | | 712 | | 693 | |
| N1 (J/m) notched D256 | 128 | | 41 | | 300 | | 240 | | 111 | |
| MFI (230° C. 2.16 kg) | 55 | | 27 | | 18.5 | | 18.1 | | 19.4 | |
| MFI/density (1/g/cc) | 61.1 | | 33.0 | | 22.5 | | 22.3 | | 23.9 | |

Example 33, 34, 35 and Comparative Example CE16A, 13B and 15B

Preferred Amount of Impact Modifier

These results are contrary to what we see with glass bubble containing formulas where the correct selection of compatibilizer type and amount improve the impact strength of a compound containing polyolefin elastomer (compare CE2C and EX5 with 30% increase in impact strength).

TABLE 21

| Component | CE13A Wt % | CE13A Vol % | CE13B Wt % | CE13B Vol % | CE16A Wt % | CE16A Vol % | EX 33 Wt % | EX 33 Vol % | EX 34 Wt % | EX 34 Vol % | EX 35 Wt % | EX 35 Vol % | EX 36 Wt % | EX 36 Vol % | CE16B Wt % | CE16B Vol % |
|---|---|---|---|---|---|---|---|---|---|---|---|---|---|---|---|---|
| PP7 | 100 | 100 | 90 | 78 | 77.7 | 70.6 | 73.8 | 66.9 | 70.2 | 63.2 | 65 | 58.3 | 56.7 | 51.2 | 46.1 | 41.4 |
| GB1 | — | — | 14 | 22 | 14.0 | 21.7 | 14.0 | 21.7 | 14 | 22.3 | 14.0 | 22.0 | 14.0 | 21.5 | 14.0 | 21.4 |
| C1 | — | — | — | — | 4.0 | 3.6 | 4.0 | 3.6 | 4.1 | 3.6 | 4.0 | 3.6 | 4.0 | 3.6 | 4.1 | 3.6 |
| IM2 | — | — | — | — | 4.3 | 4.1 | 8.2 | 7.7 | 11.7 | 11.0 | 17 | 16.1 | 25.2 | 23.7 | 35.8 | 33.5 |
| Density (g/cc) | 0.90 | | 0.817 | | 0.812 | | 0.811 | | 0.811 | | 0.823 | | 0.809 | | 0.806 | |
| TS (Mpa) | 18.2 | | 11.1 | | 16.6 | | 14.9 | | 14.7 | | 12.8 | | 10.4 | | 8.2 | |
| TM (Mpa) | 917 | | 1245 | | 1086 | | 1040 | | 940 | | 780 | | 623 | | 355 | |
| EL % | 30 | | 13 | | 4 | | 7 | | 11 | | 22 | | 48 | | 102 | |
| FS (Mpa) | 26.0 | | 20.7 | | 25.5 | | 23.6 | | 21.6 | | 19.0 | | 14.6 | | 10.1 | |
| FM @ 1% secant (Mpa) | 866 | | 1119 | | 990 | | 937 | | 850 | | 767 | | 590 | | 385 | |
| NI (J/m) notched D256 | 128 | | 41 | | 83 | | 142 | | 193 | | 300 | | 340 | | 380 | |
| MFI (230° C. 2.16 kg) | 55 | | 27 | | 25.8 | | 21.8 | | 19.6 | | 18.5 | | 13.8 | | 15.2 | |
| MFI/density (1/g/cc) | 61.1 | | 33.0 | | 31.8 | | 26.9 | | 24.2 | | 22.5 | | 17.1 | | 18.9 | |

TABLE 22

| | CE2A | | CE17A | | CE17B | | CE17C | | CE17D | | CE2C | | EX 5 | |
|---|---|---|---|---|---|---|---|---|---|---|---|---|---|---|
| | Wt % | Vol % | Wt % | Vol % | Wt % | Vol % | Wt % | Vol % | Wt % | Vol % | Wt % | Vol % | Wt % | Vol % |
| PP1 | 100 | 100 | 80 | 79.3 | 75.3 | 74.7 | 84.5 | 84.0 | 80.9 | 80.4 | 69 | 62 | 65 | 58.3 |
| GB1 | — | — | — | — | — | — | — | — | — | — | 14 | 22 | 14 | 22.0 |
| C1 | — | — | — | — | 4.7 | 4.6 | — | — | 3.6 | 3.5 | — | — | 4 | 3.6 |
| IM1 | — | — | 20 | 20.7 | 20 | 20.7 | 15.5 | 16.0 | 15.5 | 16.0 | 17 | 16 | 17 | 16.1 |
| Density (g/cc) | | 0.9 | | 0.894 | | 0.909 | | 0.895 | | 0.907 | | 0.802 | | 0.801 |
| TS (Mpa) | | 29.2 | | 21.0 | | 23.2 | | 23.2 | | 25.6 | | 13.9 | | 19.1 |
| TM (Mpa) | | 1190 | | 756 | | 878 | | 859 | | 965 | | 900 | | 1180 |
| EL % | | limit | | limit | | limit | | limit | | limit | | limit | | 14 |
| FS (MPa) | | 37.6 | | 23.6 | | 28.7 | | 26.5 | | 31.8 | | 23.8 | | 28.9 |
| FM @ 1% secant (MPa) | | 1063 | | 709 | | 849 | | 808 | | 977 | | 970 | | 1075 |
| NI (J/m) notched D256 | | 48 | | 246 | | 216 | | 147 | | 153 | | 46 | | 60 |
| MFI (230° C. 2.16 kg) | | 4.7 | | 11.0 | | 11.0 | | 9.65 | | 9.0 | | 3.8 | | 4.7 |
| MFI/density (1/g/cc) | | 5.2 | | 12.3 | | 12.1 | | 10.8 | | 9.9 | | 4.5 | | 5.5 |

This disclosure is not limited to the above-described embodiments but is to be controlled by the limitations set forth in the following claims and any equivalents thereof. This disclosure may be suitably practiced in the absence of any element not specifically disclosed herein.

What is claimed is:

1. A composition comprising:
    a polyolefin comprising first repeating units, wherein the polyolefin is other than a polypropylene homopolymer;
    hollow glass microspheres;
    a polyolefin impact modifier that is chemically non-crosslinked and free of polar functional groups; and
    a compatiblizer comprising the first repeating units and second repeating units, which are the first repeating units modified with polar functional groups,
    wherein the hollow glass microspheres are present in a range from 40% to 70% by volume, the polyolefin impact modifier is present in a range from 20% to 50% by volume, and the compatibilizer is present in a range from 4% to 12% by volume, based on the total volume of the hollow glass microspheres, the polyolefin impact modifier, and the compatibilizer, and wherein the composition has a notched izod impact strength of at least 60 joules/meter, and wherein the composition comprises greater than ten percent by weight of the glass, based on the total weight of the composition.

2. The composition of claim 1, wherein at least one of the following conditions is met: the tensile modulus of the composition is at least 50% of the polyolefin, or the tensile strength of the composition is at least 50% of the polyolefin, or the flexural modulus of the composition is at least 50% of the polyolefin, or the flexural strength of the composition is at least 50% of the polyolefin.

3. A masterbatch composition for combining with a polyolefin comprising first repeating units, wherein the polyolefin is other than a polypropylene homopolymer, and wherein the masterbatch comprises:
    hollow glass microspheres;
    a polyolefin impact modifier that is chemically non-crosslinked and free of polar functional groups; and
    a compatiblizer comprising the first repeating units and second repeating units modified with polar functional groups,
    wherein the hollow glass microspheres are present in a range from 40% to 65% by volume, the polyolefin impact modifier is present in a range from 20% to 50% by volume, and the compatibilizer is present in a range from 4% to 15% by volume, based on the total volume of the hollow glass microspheres, the polyolefin impact modifier, and the compatibilizer.

4. The composition of claim 1, wherein the polyolefin comprises at least one of polyethylene or polypropylene.

5. The composition of claim 1, wherein the first repeating units are polyethylene repeating units.

6. The composition of claim 1, wherein the polyolefin impact modifier has a melt flow index at 190° C. and 2.16 kilograms of at least 10 grams per 10 minutes.

7. The composition of claim 1, comprising greater than two percent by weight of the compatibilizer, based on the total weight of the composition.

8. The composition of claim 1, wherein the compatibilizer is a maleic anhydride-modified polyolefin.

9. The composition of claim 1, further comprising reinforcing fillers.

10. The composition of claim 1, wherein the composition comprises less than five percent by weight talc, based on the total weight of the composition, or wherein the composition comprises less than one percent by weight of at least one of montmorillonite clay having a chip thickness of less than 25 nanometers or calcium carbonate having a mean particle size of less than 100 nanometers.

11. The composition of claim 1, wherein the hollow glass microspheres are not treated with a silane coupling agent.

12. The composition of claim 1, wherein a hydrostatic pressure at which ten percent by volume of the hollow glass microspheres collapses is at least about 50 megapascals.

13. The composition of claim 1, wherein the polyolefin impact modifier is an ethylene propylene elastomer, an ethylene octene elastomer, an ethylene propylene diene elastomer, an ethylene propylene octene elastomer, or a combination thereof.

14. An article comprising the composition of claim 1, wherein the composition is a solid, wherein the article is a hardhat, or wherein the article is an interior or exterior automobile component.

15. A method of making an article, the method comprising injection molding the composition of claim 1 to make the article.

16. The composition of claim 1, wherein the first repeating units are polypropylene repeating units, and the compatibilizer comprises propylene repeating units, and the polyolefin is a copolymer comprising at least 80% by weight propylene unit or the polyolefin is a medium or high impact polypropylene.

17. The composition of claim 1, comprising greater than three percent by weight of the compatibilizer, based on the total weight of the composition.

18. The composition of claim 1, wherein the polyolefin impact modifier is an ethylene octene elastomer.

19. The composition of claim 1, wherein the composition comprises at least ten percent by weight of the glass, based on the total weight of the composition.

20. The method of claim 15, wherein the article is a hardhat, or wherein the article is an interior or exterior automobile component.

* * * * *

UNITED STATES PATENT AND TRADEMARK OFFICE
CERTIFICATE OF CORRECTION

PATENT NO. : 10,385,193 B2
APPLICATION NO. : 15/109246
DATED : August 20, 2019
INVENTOR(S) : Yalcin et al.

Page 1 of 2

It is certified that error appears in the above-identified patent and that said Letters Patent is hereby corrected as shown below:

In the Specification

Column 1
Line 11, delete "2014," and insert -- 2013, --, therefor.

Column 4
Line 41, delete "g/cm₃)" and insert -- g/cm$^3$) --, therefor.
Line 43, delete "g/cm₃)." and insert -- g/cm$^3$). --, therefor.

Column 11
Lines 1-2, delete "3-metacrylroxypropyltrimethoxysilane)." and insert
-- 3-methacryloxypropyltrimethoxysilane). --, therefor.
Line 4, delete "bis(triethoxysilipropyl)" and insert -- bis(triethoxysilylpropyl) --, therefor.

Column 12
Line 48, delete "compatilizer," and insert -- compatibilizer, --, therefor.

Column 13
Line 34, delete "meter," and insert -- meter; --, therefor.

Column 17
Line 17, delete "(AccuPcy" and insert -- (AccuPyc --, therefor.
Line 40, delete "1T503" and insert -- IT503 --, therefor.

Column 35
Line 1, delete "Example" and insert -- Examples --, therefor.
Line 2, delete "1SB" and insert -- 15B --, therefor.
Line 40, delete "Example 33," and insert -- Examples 33, --, therefor.
Line 40, delete "Comparative Example" and insert -- Comparative Examples --, therefor.

Signed and Sealed this
Twenty-fourth Day of March, 2020

Andrei Iancu
*Director of the United States Patent and Trademark Office*

In the Claims

Column 37
Line 34, Claim 1, delete "compatiblizer" and insert -- compatibilizer --, therefor.
Line 62, Claim 3, delete "compatiblizer" and insert -- compatibilizer --, therefor.